United States Patent
Komori et al.

(10) Patent No.: US 8,246,710 B2
(45) Date of Patent: *Aug. 21, 2012

(54) HONEYCOMB STRUCTURAL BODY

(75) Inventors: Teruo Komori, Ibi-gun (JP); Kazushige Ohno, Ibi-gun (JP); Sungtae Hong, Ibi-gun (JP); Yukio Oshimi, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 216 days.

This patent is subject to a terminal disclaimer.

(21) Appl. No.: 10/515,181

(22) PCT Filed: Jun. 7, 2004

(86) PCT No.: PCT/JP2004/007942
§ 371 (c)(1),
(2), (4) Date: Jul. 1, 2005

(87) PCT Pub. No.: WO2004/111398
PCT Pub. Date: Dec. 23, 2004

(65) Prior Publication Data
US 2006/0032203 A1 Feb. 16, 2006

(30) Foreign Application Priority Data
Jun. 5, 2003 (JP) ................ 2003-161261

(51) Int. Cl.
*B01D 46/00* (2006.01)
*B01D 39/20* (2006.01)
*F01N 3/023* (2006.01)

(52) U.S. Cl. .......... 55/523; 55/282.3; 55/385.3; 55/482; 55/484; 55/524; 55/DIG. 10; 55/DIG. 30; 60/311; 428/116

(58) Field of Classification Search .............. 55/282.2, 55/282.3, 385.3, 482, 484, 523, 524, DIG. 5, 55/DIG. 10, DIG. 30; 60/311; 428/116, 428/117, 118
See application file for complete search history.

(56) References Cited

U.S. PATENT DOCUMENTS
4,276,071 A * 6/1981 Outland .................. 55/523
(Continued)

FOREIGN PATENT DOCUMENTS
CA 1 224 422 7/1987
(Continued)

OTHER PUBLICATIONS
Excerpt from Japanese Industrial Standard (JIS) B 0601 1994, p. 1838.
(Continued)

*Primary Examiner* — Jason M Greene
(74) *Attorney, Agent, or Firm* — Oblon, Spivak, McClelland, Maier & Neustadt, L.L.P.

(57) ABSTRACT

An object of the present invention is to provide a honeycomb structural body with a long service life, which can reduce a pressure loss to a low level upon collecting particulates and maintain the pressure loss at the low level for a long time even after regenerating processes. The honeycomb structural body includes a columnar porous ceramic block in which a large number of through holes are placed in parallel with one another in the length direction with a wall portion interposed therebetween. Herein, the large number of through holes are constituted by a group of large-capacity through holes, each of which is sealed at one end of the honeycomb structural body so that the total sum of the areas on a cross section perpendicular to the length direction is made relatively great, and a group of small-capacity through holes, each of which is sealed at the other end of the honeycomb structural body so that the total sum of the areas on the cross section is made relatively small, and a surface roughness $R_y$ of the wall face of the through hole is set in a range from 10 to 100 µm.

15 Claims, 10 Drawing Sheets

U.S. PATENT DOCUMENTS

| | | | |
|---|---|---|---|
| 4,364,761 A | | 12/1982 | Berg et al. |
| 4,416,676 A | * | 11/1983 | Montierth ................... 55/523 |
| 4,417,908 A | * | 11/1983 | Pitcher, Jr. ................... 55/523 |
| 4,419,108 A | * | 12/1983 | Frost et al. ................... 55/523 |
| 4,420,316 A | | 12/1983 | Frost et al. |
| 4,643,749 A | | 2/1987 | Miura |
| 5,089,237 A | | 2/1992 | Schuster et al. |
| 5,519,993 A | | 5/1996 | Rao et al. |
| 5,545,243 A | | 8/1996 | Kotani et al. |
| 5,733,352 A | * | 3/1998 | Ogawa et al. ................... 55/523 |
| 5,914,187 A | * | 6/1999 | Naruse et al. ................... 55/523 |
| 5,930,994 A | | 8/1999 | Shimato et al. |
| 5,952,079 A | | 9/1999 | Andou et al. |
| 6,447,564 B1 | | 9/2002 | Ohno et al. |
| 6,565,630 B2 | | 5/2003 | Ohno et al. |
| 6,669,751 B1 | | 12/2003 | Ohno et al. |
| 6,770,116 B2 | | 8/2004 | Kojima |
| 6,939,825 B1 | | 9/2005 | Ohno et al. |
| 7,247,184 B2 | * | 7/2007 | Frost ................... 55/523 |
| 8,012,234 B2 | * | 9/2011 | Komori et al. ................... 55/523 |
| 2002/0180117 A1 | | 12/2002 | Yamamoto et al. |
| 2003/0041730 A1 | | 3/2003 | Beall et al. |
| 2003/0044572 A1 | * | 3/2003 | Beall et al. ................... 428/116 |
| 2003/0167755 A1 | | 9/2003 | Nakatani et al. |
| 2004/0031264 A1 | | 2/2004 | Kojima |
| 2004/0033175 A1 | | 2/2004 | Ohno et al. |
| 2004/0055265 A1 | | 3/2004 | Ohno et al. |
| 2004/0097370 A1 | | 5/2004 | Ichikawa et al. |
| 2004/0161596 A1 | | 8/2004 | Taoka et al. |
| 2004/0223892 A1 | | 11/2004 | Kojima |
| 2005/0076626 A1 | | 4/2005 | Kudo et al. |
| 2005/0102987 A1 | | 5/2005 | Kudo |
| 2005/0109023 A1 | | 5/2005 | Kudo et al. |
| 2005/0115224 A1 | | 6/2005 | Kojima |
| 2005/0153099 A1 | | 7/2005 | Yamada |
| 2005/0159310 A1 | | 7/2005 | Ohno et al. |
| 2005/0160710 A1 | | 7/2005 | Taoka et al. |
| 2005/0161849 A1 | | 7/2005 | Ohno et al. |
| 2005/0169818 A1 | | 8/2005 | Ohno et al. |
| 2005/0169819 A1 | | 8/2005 | Shibata |
| 2005/0175514 A1 | | 8/2005 | Ohno |
| 2005/0176581 A1 | | 8/2005 | Ohno et al. |
| 2005/0178098 A1 | | 8/2005 | Ono et al. |
| 2005/0180898 A1 | | 8/2005 | Yamada |
| 2005/0214504 A1 | | 9/2005 | Yoshida |
| 2005/0229565 A1 | | 10/2005 | Yoshida |
| 2005/0235621 A1 | | 10/2005 | Kunieda et al. |
| 2005/0247038 A1 | | 11/2005 | Takahashi |
| 2005/0272602 A1 | | 12/2005 | Ninomiya |
| 2006/0019061 A1 | | 1/2006 | Oshimi |
| 2006/0029897 A1 | | 2/2006 | Saijo et al. |
| 2006/0029898 A1 | | 2/2006 | Saijo et al. |
| 2006/0043652 A1 | | 3/2006 | Saijo et al. |
| 2006/0059877 A1 | | 3/2006 | Yoshida |
| 2007/0227109 A1 | | 10/2007 | Hong et al. ................... 55/523 |
| 2008/0085394 A1 | | 4/2008 | Ohno et al. ................... 428/117 |
| 2008/0086993 A1 | | 4/2008 | Komori et al. |
| 2008/0261806 A1 | | 10/2008 | Konstandopoulos et al. |

FOREIGN PATENT DOCUMENTS

| | | |
|---|---|---|
| EP | 0 277 012 | 8/1988 |
| EP | 0 761 279 A2 | 3/1997 |
| EP | 0 816 065 A1 | 1/1998 |
| EP | 0 884 457 | 12/1998 |
| EP | 1 489 274 A1 | 12/2004 |
| EP | 1 502 639 | 2/2005 |
| EP | 1 502 640 | 2/2005 |
| EP | 1 598 102 A1 | 11/2005 |
| FR | 2 789 327 | 8/2000 |
| FR | 2 840 545 | 12/2003 |
| JP | 56-124418 | 9/1981 |
| JP | 58-81420 | 5/1983 |
| JP | 58-92409 | 6/1983 |
| JP | 58-150015 | 9/1983 |
| JP | 58-196820 | 11/1983 |
| JP | 62 020613 | 1/1987 |
| JP | 63-185425 | 8/1988 |
| JP | 3-102016 | 10/1991 |
| JP | 5-68828 | 3/1993 |
| JP | 47620/1994 | 6/1994 |
| JP | 3130587 | 11/2000 |
| JP | 2001-96117 | 4/2001 |
| JP | 2001-206780 | 7/2001 |
| JP | 2001-334114 | 12/2001 |
| JP | 2002-177719 | 6/2002 |
| JP | 2002-273137 | 9/2002 |
| JP | 2003-1029 * | 1/2003 |
| JP | 2003-49627 | 2/2003 |
| JP | 2003-154223 | 5/2003 |
| WO | 01/23069 | 4/2001 |
| WO | 02/10562 | 2/2002 |
| WO | WO 02/10562 A1 * | 2/2002 |
| WO | 02/100514 | 12/2002 |
| WO | WO 03/020407 A2 | 3/2003 |
| WO | 03/080218 | 10/2003 |

OTHER PUBLICATIONS

A. Jena and K. Gupta, "Characterization of pore structure of filter media" Fluid/Particle Separation Journal, vol. 14, No. 3, pp. 227-241, Dec. 2002.

J. S. Reed, "Principles of Ceramics Processing", 2nd Ed., pp. 123-125, 1995.

Reply to Second Communication in the corresponding European Patent Application No. 04745652.0/2311 dated Jun. 9, 2006, pp. 1-5.

Office Action issued Nov. 30, 2010, in Japan Patent Application No. 2005-506903.

U.S. Appl. No. 10/490,206, filed Sep. 2, 2004, Hong, et al.
U.S. Appl. No. 10/490,205, filed Sep. 9, 2004, Komori, et al.
U.S. Appl. No. 10/493,056, filed Aug. 17, 2004, Hong, et al.
U.S. Appl. No. 10/129,126.
U.S. Appl. No. 11/255,197.
U.S. Appl. No. 10/502,044, filed Jan. 24, 2005, Taoka et al.
U.S. Appl. No. 10/515,179, filed Jul. 19, 2005, Yamada.
U.S. Appl. No. 10/516,328, filed Aug. 17, 2005, Komori et al.
U.S. Appl. No. 10/518,548, filed Jan. 3, 2005, Takahaski.
U.S. Appl. No. 10/521,592, filed Oct. 27, 2005, Ohno et al.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.

"Geometrical Product Specifications (GPS)—Surface texture: Profile method—Rules and procedures for the assessment of surface texture", ISO (International Organization for Standardization) 4288:1996(E), Aug. 1, 1996.

"Geometrical Product Specifications (GPS)—Surface texture: Profile method—Rules and procedures for the assessment of surface texture", ISO 4288:1996 Technical Corrigendum 1, Jun. 15, 1998.

Stobbe, et al., "SiC as a Substrate for Diesel Particulate Filters", SAE Technical Paper Series 932495, Sep. 13-15, 1993.

Merkel, et al., "Effects of Microstructure and Cell Geometry on Performance of Cordierite Diesel Particulate Filters", SAE Technical Paper Series 2001-01-0193, Mar. 5-8, 2001.

"Parameters of surface texture", Annex C Table 2, JIS (Japanese Industrial Standards) B 0601:2001, 2001.

"Geometrical Product Specifications (GPS)—Surface textire: Profile method—Rules and procedures for the assessment of surface texture", JIS (Japanese Industrial Standards) B 0633:2001, 2001.

Diagram of A3 geometries, prepared by Patent Proprietor and attached with Written Submissions by Patent Proprietor dated Sep. 15, 2009 in the Oral Proceedings of EP 1541817, and referred to as D19 in Decision dated Nov. 13, 2009.

Merkel, et al., "Thermal Durability of Wall-Flow Ceramic Diesel Particulate Filters", SAE Technical Paper Series 2001-01-0190, Mar. 5-8, 2001.

Appendix Table, prepared by Patent Proprietor and attached with Written Submissions by Patent Proprietor dated Oct. 8, 2009 in the Oral Proceedings of EP 1541817, and referred to as D21 in Decision dated Nov. 13, 2009.

Drawing showing wall thickness, prepared by Patent Proprietor and attached with Appeal Brief submitted by Patent Proprietor dated Mar. 23, 2010 in EP 1541817.

Ogyu, et al., "Improving of the Filtration and Regeneration Performance by the Sic-DPF with the Layer Coating of PM Oxidation Catalyst", SAE Technical Paper Series 2008-01-0621, Apr. 14-17, 2008.

Drawing showing the separation of ashes, prepared by Patent Proprietor and attached with Appeal Brief submitted by Patent Proprietor dated Mar. 23, 2010 in EP 1541817.

Taoka, et al., "Effect of SiC-DPF with High Cell Density for Pressure Loss and Regenaration", SAE Technical Paper Series 2001-01-0191, Mar. 5-8, 2001.

Test Report (Exfoliation Strength Test), A-Kit Corporation, Sep. 15, 2011, with English Translation.

Catalog No. 4368, Formtracer SV-C3100/4100 Series of Mitutoyo, with English Translation, Sep. 2006.

* cited by examiner

Cross-sectional view taken along line A-A (a)

(b) Cross-sectional view taken along line B-B

HONEYCOMB STRUCTURAL BODY

TECHNICAL FIELD

This application claims benefit of priority to Japanese Patent Application No. 2003-161261, filed on Jun. 5, 2003, the contents of which are incorporated by reference herein.

The present invention relates to a honeycomb structural body that is used as a filter for removing particulates and the like contained in exhaust gases discharged from an internal combustion engine such as a diesel engine or the like.

BACKGROUND ART

In recent years, particulates such as soot contained in exhaust gases discharged from internal combustion engines of vehicles such as buses, trucks and the like and construction machines have raised serious problems as those particulates are harmful to the environment and the human body.

There have been proposed various ceramic filters which allow exhaust gases to pass through porous ceramics and collect particulates in the exhaust gases, thereby purifying the exhaust gases.

Conventionally, with respect to the honeycomb filter of this type, a filter having the following structure has been proposed in which: two kinds of through holes, that is, a through hole with a relatively larger capacity (hereinafter, referred to as large-capacity through hole) and a through hole with a relatively smaller capacity (hereinafter, referred to as small-capacity through hole) are prepared, and the end on the exhaust gas outlet side of the large-capacity through hole is sealed with a plug, with the end on the exhaust gas inlet side of the small-capacity through hole being sealed with a plug, so that the surface area of the through hole with the opened inlet side (hereinafter, referred to as inlet-side through hole) is made relatively greater than the surface area of the through hole with the opened outlet side (hereinafter, referred to as outlet-side through hole); thus, it becomes possible to suppress an increase in pressure loss upon collecting particulates (for example, see Patent literature 1, and FIG. 17 of Patent literature 2).

Moreover, another filter has been disclosed in which: the number of the inlet-side through holes is made greater than the number of the outlet-side through holes, so that the surface area of the inlet-side through holes is made relatively greater than the surface area of the outlet-side through holes; thus, it becomes possible to suppress an increase in a pressure loss upon collecting particulates (for example, see FIG. 3 of Patent literature 2).

In the case of the honeycomb filter used in filters for purifying exhaust gases, disclosed in Patent literature 1 and Patent literature 2, in comparison with a honeycomb filter in which the total amount of the surface area of the inlet-side through holes and the total amount of the surface area of the outlet-side through holes are the same, since the surface area of the inlet-side through holes is relatively greater, with the result that the deposition layer of collected particulates becomes thinner, thereby making it possible to suppress an increase in a pressure loss at the time of collecting particulates.

Moreover, after having collected a predetermined amount of particulates, an engine controlling process is carried out through a post injection system or the like to raise the exhaust gas temperature and the temperature of a heater placed on the upstream side of exhaust gases from the honeycomb structural body is raised so that, upon burning particulates, the particulates are made in contact with high-temperature gases to be easily burned, making it possible to accelerate the burning speed of the particulates.

However, in the above-mentioned conventional honeycomb filters, ashes that remain as dregs after particulates have been burnt are accumulated on the wall face of the through holes as they are without being moved. For this reason, the problems with the above-mentioned structures are that pores, formed in the partition wall, are closed and that the ashes tend to form bridges to cause clogging in the through holes, resulting in an abrupt rise in the pressure loss.

Moreover, in the case of the honeycomb filter shown in FIG. 17 of Patent literature 2, as the surface area of the large-capacity through holes is made relatively greater, the weight of the honeycomb structural body constituting the honeycomb filter tends to decrease, resulting in a reduction in the thermal capacity and the subsequent good thermal response. Consequently, the burning speed of particulates becomes too fast, with the result that ashes are deposited on the wall faces of the through holes, as they are, without being moved, and the ashes tend to form bridges to cause clogging in the through holes, resulting in an abrupt rise in the pressure loss.

Patent literature 1: Patent gazette No: 3130587
Patent literature 2: U.S. Pat. No. 4,417,908 (FIG. 3, FIG. 17 and the like)

DISCLOSURE OF THE INVENTION

The Problem that the Invention is to Solve

The present invention has been devised so as to solve the above-mentioned problems, and it is an object thereof to provide a honeycomb structural body (filter) with a long service life, which can reduce a pressure loss to a low level upon collecting particulates and maintain the pressure loss at the low level for a long time even after regenerating processes.

The Means for Solving the Problem

The present invention is a honeycomb structural body made of a columnar porous ceramic block in which a large number of through holes are placed in parallel with one another in the length direction with a wall portion interposed therebetween, wherein said large number of through holes comprises:

a group of large-capacity through holes, each of which is sealed at one end of said honeycomb structural body such that the total sum of the areas thereof on a cross section perpendicular to the length direction is made relatively great; and a group of small-capacity through holes, each of which is sealed at the other end of said honeycomb structural body such that the total sum of the areas on said cross section is made relatively small, a surface roughness $R_y$ of the wall face of said through hole being set in a range from 10 to 100 μm.

The following description will discuss the honeycomb structural body of the present invention.

In the present invention, the surface roughness (greatest height) $R_y$ of the wall face of the through hole, measured based upon JIS B 0601, is set in a range from 10 to 100 μm; therefore, the pores and grains on the through hole wall face are properly placed to form appropriate irregularities so that the deposition state of particulates is allowed to change depending on these irregularities, making it possible to reduce a pressure loss to a low level upon collecting particulates.

Moreover, upon carrying out a regenerating process, the resulting ashes are easily moved through the through holes to the outlet side of exhaust gases, making it possible to reduce clogging caused by ashes deposited on the wall face of the through hole; therefore, it becomes possible to effectively utilize the capacity of the large-capacity through hole, to maintain a pressure loss in a low level for a long time, to reduce load imposed on the engine, and consequently to provide a honeycomb structural body having a long service life. Thus, it becomes possible to cut maintenance costs required for back washing and the like.

In the present invention, the mechanism that makes the pressure loss lower has not been sufficiently clarified; however, the mechanism is presumably explained as follows:

The honeycomb structural body of the present invention has the group of large-capacity through holes and the group of small-capacity through holes, and the aperture rates of the two end faces are different from each other. The honeycomb structural body of this type has such a structure that a proportion of the partition wall located between the through holes constituting the group of large-capacity through holes becomes greater. In other words, a proportion of the partition wall located between the through holes constituting the group of large-capacity through holes and the through holes constituting the group of small-capacity through holes becomes smaller.

Therefore, this structure makes it difficult for gases to directly flow from the through holes constituting the group of large-capacity through holes to the through holes constituting the group of small-capacity through holes. For this reason, in comparison with the honeycomb structural body in which the aperture rates of the two end faces are the same, the flow rate of gases flowing into the partition wall becomes greater, in the case of the same displacement of engines, with the result that high-density particulates and ashes are formed and easily allowed to penetrate the through holes deeply.

In addition to the above-mentioned structure, the honeycomb structural body of the present invention is designed to have a predetermined surface roughness on its through-hole wall face. When the surface roughness of the through-hole wall face is made higher to a certain degree, the deposition state of soot and ashes at the corresponding portion becomes irregular and the gas flow is locally changed so that it is possible to prevent too much soot and ashes from entering the wall and also to easily exfoliate the soot and ashes; thus, it becomes possible to avoid forming a thick deposition layer, and consequently to reduce the pressure loss.

Therefore, in the honeycomb structural body of the present invention, although the amount of deposition of soot and ashes partially increases, the soot and ashes are easily exfoliated, with the result that the pressure loss becomes smaller.

In the case when the surface roughness (greatest height) $R_y$ of the wall face, measured based upon JIS B 0601, exceeds 100 μm, extremely high local portions and extremely low local portions are present on the partition wall. Further, in the case when the surface roughness is too large, since particulates are deposited on the wall face of the through hole irregularly, or are deposited in a manner so as to invade into the wall, some portions having remaining ashes and other portions having no remaining ashes are formed on the wall face and inside the wall, and it is assumed: those portions having more remaining ashes are apt to have clogging and bridge formation, resulting in a high pressure loss.

In the case when the surface roughness (greatest height) $R_y$ of the wall face, is less than 10 μm, it is considered that the wall face of the through hole becomes flat, and the flat wall face makes it difficult for gases to flow therein, failing to provide the above-mentioned exfoliating effect to cause a high pressure loss. Moreover, in the case when particulates form a deposition layer on the wall face with being deposited on ashes with a high density, the ashes are condensed (with an increased bulk density) and become difficult to be exfoliated. When it becomes difficult for gases to flow therein, it becomes difficult to burn the soot, resulting in a difficulty in carrying out a regenerating process and the subsequent increase in the pressure loss. Moreover, since the honeycomb structural body becomes close to a compact state, even a small amount of particulate deposition causes an abrupt increase in the pressure loss, resulting in a great load on the engine and the subsequent instability in the amount of discharged particulates. Consequently, the collecting state of particulates becomes irregular, and upon regenerating, ashes tend to form bridges, with the result that clogging in the pores tends to occur to also cause an increase in the pressure loss.

Here, the surface roughness (greatest height) $R_y$ of the wall face measured based upon JIS B 0601 refers to a value obtained through the following processes: a standard length is drawn from a roughness curve in the direction of its average line, and with respect to the drawn portion, the distance between the peak line and the bottom line is measured in the direction of longitudinal magnification of the roughness curve; thus, the resulting value is indicated by a unit of μm.

The Effect of the Present Invention

The honeycomb structural body of the present invention makes it possible to suppress an increase in pressure loss upon collecting particulates.

Moreover, the honeycomb structural body of the present invention also makes it possible to maintain the pressure loss caused by ash deposition at a low level for a long time even after regenerating processes, and consequently to effectively utilize the capacity of the large-capacity through holes; thus, it becomes possible to reduce a load imposed on the engine, and to provide a honeycomb structural body having a long service life. Thus, it becomes possible to cut maintenance costs required for back washing and the like.

The Best Mode for Carrying Out the Present Invention

A honeycomb structural body of the present invention is a honeycomb structural body made of a columnar porous ceramic block in which a large number of through holes are placed in parallel with one another in the length direction with a wall portion interposed therebetween,
wherein
said large number of through holes comprises:
a group of large-capacity through holes, each of which is sealed at one end of said honeycomb structural body such that the total sum of the areas thereof on a cross section perpendicular to the length direction is made relatively great; and
a group of small-capacity through holes, each of which is sealed at the other end of said honeycomb structural body such that the total sum of the areas on said cross section is made relatively small,
a surface roughness $R_y$ of the wall face of said through holes being set in a range from 10 to 100 μm.

The honeycomb structural body of the present invention is made of a columnar porous ceramic block in which a large number of through holes are placed in parallel with one another in the length direction with a wall portion interposed therebetween, however, the porous ceramic block may be constituted by combining a plurality of columnar porous ceramic members, each having a plurality of through holes that are placed in parallel with one another in the length direction with partition wall interposed therebetween, with one another through sealing material layers (hereinafter, also referred to as an aggregated honeycomb structural body), or may be formed by ceramic members that are integrally sintered as one unit as a whole (hereinafter, also referred to as an integral honeycomb structural body).

Moreover, the honeycomb structural body may contain the porous ceramic block, with a sealing material layer being formed on the circumference thereof.

In the case of the aggregated honeycomb structural body, the wall portion is constituted by a partition wall that separates through holes of porous ceramic members, an outer wall of the porous ceramic member and a sealing material layer that serves as a bonding agent layer between the porous ceramic members, and in the case of the integral honeycomb structural body, the wall portion is formed by a partition wall of one kind.

Moreover, the large number of through holes formed in the honeycomb structural body may comprise: a group of large-capacity through holes, each of which is sealed at one end of the honeycomb structural body such that the total sum of the areas on a cross section perpendicular to the length direction is made relatively great, and a group of small-capacity through holes each of which is sealed at the other end of the honeycomb structural body such that the total sum of the areas on the above-mentioned cross section is made relatively small.

Here, each of the through holes may have the same area in the cross section perpendicular to the length direction of the through holes, and the number of the through holes constituting the group of large-capacity through holes with one end being sealed is made greater than the number of the through holes constituting the group of small-capacity through holes with the other end being sealed, or the area in the cross section perpendicular to the length direction of the through holes constituting the group of large-capacity through holes with one end being sealed may be made relatively greater, while the area in the cross section perpendicular to the length direction of the through holes constituting the group of small-capacity through holes with the other end being sealed is made relatively smaller.

Further, in the latter case, not particularly limited, as long as the total sum of the areas on a cross section perpendicular to the length direction of the through holes constituting the group of large-capacity through holes is made greater than the total sum of the areas on the cross section perpendicular to the length direction of the through holes constituting the group of small-capacity through holes, the number of through holes constituting the group of large-capacity through holes and the number of through holes constituting the group of small-capacity through holes may be the same or different from each other.

Moreover, in the honeycomb structural body of the present invention, shapes serving as basic units are repeated, and from the viewpoint of the basic units, the area ratios in the cross section are different from each other. Therefore, in the case when a specific structure is included in the honeycomb structural body of the present invention when measurements are strictly carried out up to one or two cells on the circumference, the calculations need to be carried out by excluding the one or two cells, or the calculations need to be carried out except for portions that are not repetitions of the basic units so that a determination is made as to whether or not the structure is included in the present invention. More specifically, for example, as shown in FIG. 8, a honeycomb structural body having any structure in which, in the case when, with respect to the shape of a cross section perpendicular to the length direction of the through holes, the cross-sectional shapes except for those in the vicinity of the circumference are the same, sealed portions and opened portion of each of the ends are placed in a manner so as to form a staggered pattern as a whole, is determined not to be included in the honeycomb structural body of the present invention.

FIG. 1 is a perspective view that schematically shows a specific example of an aggregated honeycomb structural body that is one example of the honeycomb structural body of the present invention, FIG. 2(*a*) is a perspective view that schematically shows one example of a porous ceramic member that forms the honeycomb structural body shown in FIG. 1, and FIG. 2(*b*) is a cross-sectional view taken along line A-A of the porous ceramic member shown in FIG. 2(*a*). In the honeycomb structural body shown in FIG. 1, the large number of through holes are constituted by two kinds of through holes, that is, large-capacity through holes each of which has a comparatively large area on the cross section perpendicular to the length direction and small-capacity through holes each of which has a comparatively small area on the above-mentioned cross section.

As shown in FIG. 1, the honeycomb structural body 10 of the present invention has a structure in which a plurality of porous ceramic members 20 are combined with one another through sealing material layers 14 to form a ceramic block 15, with a sealing material layer 13 used for preventing exhaust-gas leak being formed on the periphery of this ceramic block 15. Here, the sealing material layer is formed, if necessary.

Here, in the porous ceramic member 20, a large number of through holes 21 are placed in parallel with one another in the length direction, and the through holes 21 are constituted by two kinds of through holes, that is, large-capacity through holes 21*a* each of which has a comparatively large area on the cross section perpendicular to the length direction and small-capacity through holes 21*b* each of which has a comparatively small area on the above-mentioned cross section, and each of the large-capacity through holes 21*a* is sealed with a plug 22 at the end on the exhaust-gas outlet side of the honeycomb structural body 10, while each of the small-capacity through holes 21*b* is sealed with a plug 22 at the end on the exhaust-gas inlet side of the honeycomb structural body 10; thus, a partition wall 23, which separate these through holes, is allowed to function as filters. In other words, exhaust gases that have entered the large-capacity through holes 21*a* are allowed to flow out of the small-capacity through holes 21*b* after necessarily passing through the partition wall 23.

In the honeycomb structural body 10 shown in FIG. 1, the shape is formed as a column shape; however, not particularly limited to the column shape, for example, any desired shape such as an elliptical column shape and a rectangular pillar shape may be used.

In the honeycomb structural body of the present invention, with respect to the material for the porous ceramic material, not particularly limited, examples thereof include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite and the like. Moreover, the honeycomb structural body of the present invention may be made of a composite material of silicon and silicon carbide or the like, or may be made of aluminum titanate. Among these, silicon carbide, which has high heat resistance, superior mechanical properties and high thermal conductivity, is desirably used.

Although not particularly limited, the porosity of the porous ceramic member is preferably set in a range from 20 to 80%. When the porosity is less than 20%, the honeycomb structural body of the present invention is more likely to cause clogging, while the porosity exceeding 80% causes degradation in the strength of the porous ceramic member, with the result that it might be easily broken. Since the wall face roughness of the through holes also varies depending on the porosity of the honeycomb structural body, the honeycomb structural body needs to be produced by taking into consideration factors, such as macroscopic flatness in which no pores are taken into consideration and porosity, so that the surface roughness (greatest height) $R_y$ of the wall face, measured based upon JIS B 0601, is set in a range from 10 to 100 µm.

Here, the above-mentioned porosity can be measured through known methods, such as a mercury press-in method, Archimedes method and a measuring method using a scanning electronic microscope (SEM).

The average pore diameter of the porous ceramic members is preferably set in a range from 1 to 100 µm. The average pore diameter of less than 1 µm tends to cause clogging of particulates easily. In contrast, the average pore diameter exceeding 100 µm tends to cause particulates to pass through the pores, with the result that the particulates cannot be collected, making the members unable to function as a filter.

With respect to the particle size of ceramic particles to be used upon manufacturing the porous ceramic members, although not particularly limited, those which are less susceptible to shrinkage in the succeeding sintering process are preferably used, and for example, those particles, prepared by combining 100 parts by weight of particles having an average particle size from 0.3 to 50 µm with 5 to 65 parts by weight of particles having an average particle size from 0.1 to 1.0 µm, are preferably used. By mixing ceramic powders having the above-mentioned respective particle sizes at the above-mentioned blending ratio, it is possible to provide a porous ceramic member.

Moreover, by adjusting the particle sizes of the above-mentioned two kinds of powders, in particular, the particle size of the powder having the greater particle size, the wall face roughness of the through holes can be adjusted. In the case when an integral honeycomb structural body is produced, the same method can be used.

The above-mentioned plug is preferably made of porous ceramics.

In the honeycomb structural body of the present invention, since the porous ceramic member with one end sealed with the plug is made of porous ceramics, by making the plug using the same porous ceramics as the porous ceramic member, it becomes possible to increase the bonding strength between the two materials, and by adjusting the porosity of the plug in the same manner as that of the above-mentioned porous ceramic member, it is possible to take the matching of the coefficient of thermal expansion of the porous ceramic member and the coefficient of thermal expansion of the plug; thus, it becomes possible to prevent the occurrence of a gap between the plug and the partition wall due to a thermal stress that is exerted upon production as well as upon use and the occurrence of a crack in the plug or the portion of the partition wall with which the plug comes in contact.

In the case when the plug is made from porous ceramics, with respect to the material thereof, not particularly limited, the same material as the ceramic material forming the porous ceramic member may be used.

In the honeycomb structural body of the present invention, the sealing material layers 13 and 14 are formed between the porous ceramic members 20 as well as on the periphery of the ceramic block 15. Further, the sealing material layer 14, formed between the porous ceramic members 20, also serves as a bonding agent that binds a plurality of porous ceramic members 20 with one another, and the sealing material layer 13, formed on the periphery of the ceramic block 15, serves as a sealing material used for preventing leak of exhaust gases from the peripheral portion of the ceramic block 15, when the honeycomb structural body 10 of the present invention is placed in an exhaust passage of an internal combustion engine.

With respect to the material for forming the sealing material layer, not particularly limited, examples thereof include an inorganic binder, an organic binder and inorganic fibers and/or inorganic particles.

Here, as described above, in the honeycomb structural body of the present invention, the sealing material layer is formed between the porous ceramic members as well as on the periphery of the ceramic block; and these sealing material layers may be made from the same material or materials different from each other. Moreover, in the case when the sealing material layers are made from the same material, the blending ratios of the materials may be the same or different from each other.

With respect to the inorganic binder, for example, silica sol, alumina sol and the like may be used. Each of these may be used alone or two or more kinds of these may be used in combination. Among the inorganic binders, silica sol is more preferably used.

With respect to the organic binder, examples thereof include polyvinyl alcohol, methyl cellulose, ethyl cellulose and carboxymethyl cellulose. Each of these may be used alone or two or more kinds of these may be used in combination. Among the organic binders, carboxymethyl cellulose is more preferably used.

With respect to the inorganic fibers, examples thereof include ceramic fibers, such as silica-alumina, mullite, alumina and silica. Each of these may be used alone or two or more kinds of these may be used in combination. Among the inorganic fibers, silica-alumina fibers are more preferably used.

With respect to the inorganic particles, examples thereof include carbides, nitrides and the like, and specific examples include inorganic powder or whiskers made from silicon carbide, silicon nitride, boron nitride and the like. Each of these may be used alone, or two or more kinds of these may be used in combination. Among the inorganic fine particles, silicon carbide having superior thermal conductivity is preferably used.

The sealing material layer 14 may be made from a compact material or may be made from a porous material so as to allow exhaust gases to flow therein; however, the sealing material layer 13 is preferably made from a compact material. This is because the sealing material layer 13 is formed so as to prevent leak of exhaust gases from the periphery of the ceramic block 15 when the honeycomb structural body 10 of the present invention is placed in an exhaust passage of an internal combustion engine.

FIG. 3(a) is a perspective view that schematically shows a specific example of an integral honeycomb structural body that is one example of a honeycomb structural body of the present invention, and FIG. 3(b) is a cross-sectional view taken along line B-B of FIG. 3(a). Here, in the honeycomb structural body shown in FIG. 3, a large number of through holes are constituted by two kinds of through holes, that is, large-capacity through holes each of which has an area on a cross section perpendicular to the length direction that is relatively greater, and small-capacity through holes each of which has an area on the cross section that is relatively smaller.

As shown in FIG. 3(a), the honeycomb structural body 30 includes a columnar porous ceramic block 35 in which a large number of through holes 31 are placed in parallel with one another in the length direction with a partition wall 33 interposed therebetween. The through holes 31 are constituted by two kinds of through holes, that is, large-capacity through holes 31a each of which has an area on a cross section perpendicular to the length direction that is relatively greater, and small-capacity through holes 31b each of which has an area on the cross section perpendicular to the length direction that is relatively smaller, and each of the large-capacity through holes 31a is sealed with a plug 32 at an end on the exhaust-gas outlet side of the honeycomb structural body 30, while each of the small-capacity through holes 31b is sealed with a plug 32 at an end on the exhaust-gas inlet side of the honeycomb structural body 30, so that a partition wall 33 that separate the through holes 31 is allowed to serve as filters.

Although not shown in FIG. 3, a sealing material layer may be formed on the circumference of the porous ceramic block 35 in the same manner as the honeycomb structural body 10 shown in FIG. 1.

Except that the porous ceramic block 35 has an integral structure formed through a sintering process, the honeycomb structural body 30 has the same structure as the aggregated honeycomb structural body 10 so that exhaust gases that have entered the large-capacity through holes 31a are allowed to flow out of the small-capacity through holes 31b after passing through the partition wall 33 that separates the through holes 31. Therefore, the integral honeycomb structural body 30 also has the same effects as those of the aggregated honeycomb structural body.

In the same manner as the aggregated honeycomb structural body 10, the shape and size of the integral honeycomb structural body 30 may also be determined desirably, and the porosity thereof is preferably set in a range from 20 to 80%, with the pore diameter being preferably set in a range from 1 to 100 μm, in the same manner as the aggregated honeycomb structural body.

With respect to the porous ceramics constituting the porous ceramic block 35, not particularly limited, the same nitride, carbide and oxide ceramics used in the aggregated honeycomb structural body may be proposed, and in general, oxide ceramics such as cordierite are used. These materials make it possible to cut manufacturing costs, and since these materials have a comparatively small coefficient of thermal expansion, it is possible to make the honeycomb structural body less susceptible to damage due to a thermal stress that is exerted during production as well as during use.

The plug 32 to be used in the integral honeycomb structural body 30 is also preferably made from porous ceramics, and with respect to the material thereof, although not particularly limited, for example, the same materials as the ceramic materials used for forming the above-mentioned porous ceramic block 35 may be used.

In the honeycomb structural body of the present invention having the structures as shown in FIGS. 1 and 3, the density of the through holes on the cross section perpendicular to the length direction is preferably set in a range from 15.5 to 62 (pcs/cm$^2$).

When the density of the through holes on the cross section perpendicular to the length direction exceeds 62 (pcs/cm$^2$), the cross-sectional area of each of the through holes becomes too small, with the result that ashes tend to form bridges to cause clogging; in contrast, in the case when the density of the through holes is less than 15.5 (pcs/cm$^2$), since the filtering area reduces in the honeycomb structural body as a whole, the pressure loss, caused upon collecting particulates, becomes greater, resulting in a great load on the engine and the subsequent instability in the discharge amount of particulates. Consequently, the collecting state of particulates also becomes unstable, with the result that upon regenerating, ashes tend to form bridges to cause clogging in the pores and the subsequent increase in the pressure loss.

Moreover, in the above-mentioned honeycomb structural body, the shape of a cross-section perpendicular to the length direction of each of those through holes (large-capacity through holes and/or small-capacity through holes) is preferably formed into a polygonal shape, more preferably, a quadrangle or an octagon.

This polygonal shape eliminates portions of the through hole that cause greater friction when exhaust gases are allowed to pass through the large-capacity through hole and/or the small-capacity through hole due to the shape of the through hole, and consequently reduces a pressure loss caused by the friction of exhaust gases upon passing through the through hole, and also eliminates portions of a partition wall with irregular thicknesses, that is, portions that locally make it difficult for exhaust gases to pass through so as to reduce a pressure loss caused by resistance of a partition wall exerted when exhaust gases pass through the partition wall; thus, the polygonal shape is allowed to exert either of the above-mentioned effects.

Moreover, among polygonal shapes, a polygonal shape of a quadrangle or more is preferably used, and at least one of the corners is preferably formed as an obtuse angle. With this arrangement, it becomes possible to reduce a pressure loss caused by friction of exhaust gases upon flowing through the through hole inlet side or friction of exhaust gases upon flowing through the through hole outlet side.

Furthermore, on the cross section perpendicular to the length direction, at least one angle at which a wall portion, shared by one large-capacity through hole and an adjacent large-capacity through hole, and a wall portion shared by one large-capacity through hole and an adjacent small-capacity through hole, are caused to intersect with each other is preferably set to an obtuse angle.

The vicinity of each of corners on the cross section of the large-capacity through hole and/or the small-capacity through hole is preferably formed by a curved line. By forming the corner into a curved line, it becomes possible to prevent occurrence of cracks caused by a stress concentration at the corner.

In the present invention, the ratio of areas (the group of large-capacity through holes/the group of small-capacity through holes) on the cross section between the group of large-capacity through holes and the group of small-capacity through holes is preferably set in a range from 1.01 to 6.

When the ratio of areas (the group of large-capacity through holes/the group of small-capacity through holes) exceeds 6, the capacity of the group of small-capacity through holes becomes too small, with the result that the pressure loss, caused by friction upon passing through the through-hole outlet side and resistance upon passing through the partition wall, increases to cause an increase in the initial pressure loss. The ratio of the areas (the group of large-capacity through holes/the group of small-capacity through holes) is preferably set in a range from 1.2 to 5. More preferably, the ratio of the areas (the group of large-capacity through holes/the group of small-capacity through holes) is set in a range from 1.2 to 3.0.

Moreover, the ratio of areas (the group of large-capacity through holes/the group of small-capacity through holes) on the cross section between the group of large-capacity through holes and the group of small-capacity through holes is preferably set in a range from 1.01 to 6. The ratio of areas (the group of large-capacity through holes/the group of small-capacity through holes) is also referred to as an aperture ratio.

When the aperture ratio exceeds 6, the capacity of the group of small-capacity through holes becomes too small, with the result that the pressure loss, caused by friction upon passing through the through-hole outlet side and resistance upon passing through the partition wall, increases to cause an increase in the initial pressure loss. The above-mentioned aperture ratio is preferably set in a range from 1.2 to 5. Moreover, the above-mentioned aperture ratio is more preferably set in a range from 1.2 to 3.0.

FIGS. 4(a) to 4(d) as well as FIGS. 5(a) to 5(f) are cross-sectional views each of which schematically shows one portion of the cross section of a porous ceramic member constituting the aggregated honeycomb structural body in accordance with the present invention, and FIG. 6 is a cross-sectional view that schematically shows a cross section of a porous ceramic member constituting the integral honeycomb structural body in accordance with the present invention. Here, regardless of the integral type and the aggregated type, the shapes of the cross sections of the large-capacity through hole and the small-capacity through hole are respectively the same; therefore, referring to these Figures, the cross-sectional shapes of the large-capacity through hole and the small-capacity through hole in the honeycomb structural body of the present invention are explained.

In FIG. 4(a), the aperture ratio is almost 1.55, in FIG. 4(b), it is almost 2.54, in FIG. 4(c), it is almost 4.45 and in FIG. 4(d), it is almost 6.00. Moreover, in FIGS. 5(a), 5(c) and 5(e), all the aperture ratios are almost 4.45, in FIGS. 5(b), 5(d) and 5(f), all the aperture ratios are almost 6.0, and in FIG. 6, the aperture ratio is 3.0.

In FIGS. 4(a) to 4(d), each of the cross-sectional shapes of the large-capacity through holes is an octagon, and each of the cross-sectional shapes of the small-capacity through holes is a quadrangle (square), and these are alternately arranged; thus, by changing the cross-sectional area of each of the small-capacity through holes, with the cross-sectional shape of each of the large-capacity through holes being slightly changed, it is possible to desirably change the aperture ratio easily. In the same manner, with respect to the honeycomb filters shown in FIGS. 5 and 6, the aperture ratios thereof can be desirably changed.

Here, in honeycomb structural bodies 160 and 260 shown in FIGS. 5(a) and 5(b), each of the cross-sectional shapes of the large-capacity through holes 161a and 261a is a pentagon with three corners thereof being set to almost right angles, and each of the cross-sectional shapes of the small-capacity through holes 161b and 261b is a quadrangle, and the respective quadrangles are placed at portions of a greater quadrangle, which diagonally face each other. Honeycomb structural bodies 170 and 270, shown in FIGS. 5(c) and 5(d), have modified shapes of the cross sections shown in FIGS. 4(a) to 4(d) so that each partition wall shared by each of the large-capacity through holes 171a, 271a and each of the small-capacity through holes 171b, 271b is expanded toward the small-capacity through hole side with a certain curvature. This curvature may be arbitrarily set.

In this case, the curved line, which constitutes the partition wall shared by each of the large-capacity through holes 171a, 271a and each of the small-capacity through holes 171b, 271b, corresponds to ¼ of a circle.

In honeycomb structural bodies 180 and 280 shown in FIGS. 5(e) to 5(f), the large-capacity through holes 181a, 281a and the small-capacity through holes 281b, 281b are formed into quadrangles (rectangular shapes), and as shown in Figures, these through holes are arranged so that, when the two large-capacity through holes and the two small-capacity through holes are combined with one another, an almost square shape is formed.

In a honeycomb structural body 60 shown in FIG. 6, a square-shaped small-capacity through hole 61b is formed at each of portions corresponding to crossing points of a rectangular arrangement, and each large-capacity through hole 61a has a square shape with four corners being chipped with small quadrangles, and a partition wall 62a and 62b separating these are formed.

In the present invention, the distance between centers of gravity of cross sections perpendicular to the length direction of adjacent large-capacity through holes is preferably designed to be equal to the distance between centers of gravity of cross sections perpendicular to the length direction of adjacent small-capacity through holes.

The term "the distance between centers of gravity of the cross sections of adjacent large-capacity through holes" represents a smallest distance between the center of gravity on a cross section perpendicular to the length direction of one large-capacity through hole and the center of gravity on a cross section perpendicular to the length direction of an adjacent large-capacity through hole; and the term "the distance between centers of gravity of the cross sections of adjacent small-capacity through holes" represents a smallest distance between the center of gravity on a cross section perpendicular to the length direction of one small-capacity through hole and the center of gravity on a cross section perpendicular to the length direction of an adjacent small-capacity through hole.

In the case when the above-mentioned two distances between centers of gravity are equal to each other, since heat is uniformly dispersed upon regenerating, it is possible to prevent the temperature inside the honeycomb structural body from being locally distributed in a biased manner, and consequently to provide a filter having superior durability free from cracks caused by a thermal stress, even after a long-term use.

When the honeycomb structural body of the present invention is used as a filter, collected particulates are gradually deposited on the inside of each of the through holes constituting the honeycomb structural body.

In the present invention, since the surface roughness (greatest height) $R_y$ of the wall face of the through hole, measured based upon JIS B 0601, is set in a range from 10 to 100 μm, the pores and grains on the through hole wall face are properly placed to form appropriate irregularities so that particulates are allowed to deposit on the wall face of each through hole uniformly because of such appropriate irregularities; thus, it becomes possible to suppress the pressure loss upon collecting particulates to a low level.

Moreover, as the amount of deposited particulates becomes greater, the pressure loss increases gradually, and when it exceeds a predetermined value, the load imposed on the engine becomes too high; therefore, the filter is regenerated by burning the particulates.

In addition to carbon and the like that are burned to disappear, the particulates include metals and the like that form oxides when burned, with the result that even after the particulates have been burned, the oxides and the like of these metals remain in the filter as ashes.

The way how the ashes remain is greatly influenced by the filter structure and the like; however, in the present invention, since the surface roughness (greatest height) $R_y$ of the wall face of the through hole, measured based upon JIS B 0601, is set in a range from 10 to 100 μm, as described above, the ashes are easily moved to the exhaust-gas outlet side through the through holes upon carrying out the regenerating process so that the wall face of each through hole becomes less susceptible to clogging; therefore, the capacity of each large-capacity through hole is effectively utilized, the pressure loss is maintained in a low level for a long time to reduce the load imposed on the engine, and it becomes possible to provide a honeycomb structural body having a long service life. Consequently, it becomes possible to cut maintenance costs required for back washing and the like.

The following description will discuss one example of a manufacturing method for the honeycomb structural body of the present invention. In the case when the structure of the honeycomb structural body of the present invention is prepared as an integral honeycomb structural body constituted by one sintered body as a whole as shown in FIG. 3, first, an extrusion molding process is carried out by using the above-mentioned material paste mainly composed of ceramics to manufacture a ceramic formed body having almost the same shape as the honeycomb structural body 30 shown in FIG. 3.

In this case, metal molds to be used for extrusion-molding two types of through holes, that is, for example, the large-capacity through holes and the small-capacity through holes, are properly selected in association with the density of each of the through holes.

With respect to the material paste, not particularly limited as long as the porosity of the porous ceramic block that has been manufactured is set in a range from 20 to 80%, for example, the aforementioned material, prepared by adding a binder and a dispersant solution to powder made from ceramics, may be used.

With respect to the above-mentioned binder, not particularly limited, examples thereof include: methylcellulose, carboxy methylcellulose, hydroxy ethylcellulose, polyethylene glycol, phenolic resin, epoxy resin and the like.

In general, the blended amount of the above-mentioned binder is preferably set to 1 to 10 parts by weight with respect to 100 parts by weight of ceramic powder.

With respect to the dispersant solution, not particularly limited, examples thereof include: an organic solvent such as benzene; alcohol such as methanol; water and the like.

An appropriate amount of the above-mentioned dispersant solution is mixed therein so that the viscosity of the material paste is set within a fixed range.

These ceramic powder, binder and dispersant solution are mixed by an attritor or the like, and sufficiently kneaded by a kneader or the like, and then extrusion-molded so that the above-mentioned ceramic formed body is manufactured.

Moreover, a molding auxiliary may be added to the material paste, if necessary.

With respect to the molding auxiliary, not particularly limited, examples thereof include: ethylene glycol, dextrin, fatty acid soap, polyalcohol and the like.

Furthermore, a pore-forming agent, such as balloons that are fine hollow spheres composed of oxide-based ceramics, spherical acrylic particles and graphite, may be added to the above-mentioned material paste, if necessary.

With respect to the above-mentioned balloons, not particularly limited, for example, alumina balloons, glass microballoons, shirasu balloons, fly ash balloons (FA balloons) and mullite balloons may be used. Among these, fly ash balloons are more preferably used.

In the honeycomb structural body of the present invention, the surface roughness $R_y$ of the wall face of the through hole, measured based upon JIS B 0601, is set in a range from 10 to 100 μm; therefore, in order to allow the through-hole wall face of the produced honeycomb structural body to have a roughened surface having the above-mentioned roughness, the through-hole surface forming portion of a metal mold to be used for the extrusion molding process is roughened through an appropriate method.

The surface roughness can be changed by changing drying conditions in the following drying process; however, since cracks tend to occur in the raw molded body depending on conditions, preferably, drying conditions are not changed from those of the conventional manufacturing method.

Moreover, by changing the density (porosity) of the honeycomb structural body, the surface roughness of the through hole can be changed. In this case, by changing the combination of particle sizes of two kinds of ceramic powders contained in the material paste, the density of the honeycomb structural body can be changed.

Next, after the above-mentioned ceramic formed body has been dried by using a drier such as a microwave drier, a hot-air drier, a dielectric drier, a reduced-pressure drier, a vacuum drier and a frozen drier, predetermined through holes are filled with plug paste to form plugs so that a mouth-sealing process for plugging the through holes is carried out.

With respect to the above-mentioned plug paste, not particularly limited as long as the porosity of a plug manufactured through post-processes is set in a range from 20 to 80%, for example, the same material paste as described above may be used; however, those pastes, prepared by adding a lubricant, a solvent, a dispersant and a binder to ceramic powder used as the above-mentioned material paste, are preferably used. With this arrangement, it becomes possible to prevent ceramics particles in the plug paste from settling in the middle of the sealing process.

Next, the ceramic dried body filled with the plug paste is subjected to degreasing and sintering processes under predetermined conditions so that a honeycomb structural body constituted by a single sintered body as a whole is manufactured.

Here, with respect to the degreasing and sintering conditions and the like of the ceramic dried body, it is possible to apply conditions that have been conventionally used for manufacturing a honeycomb structural body made from porous ceramics.

The roughness of the through-hole wall face may be adjusted by subjecting the through holes of the resulting honeycomb structural body to a roughening process such as a sand blasting process.

In the case when the structure of the honeycomb structural body of the present invention is prepared as an aggregated honeycomb structural body constituted by a plurality of porous ceramic members combined with one another through sealing material layers as shown in FIG. 1, first, an extrusion molding process is carried out by using the above-mentioned material paste mainly composed of ceramics to manufacture a raw ceramic formed body having a shape like a porous ceramic member 20 shown in FIG. 2. At this time, in order to allow the through-hole wall face of the produced honeycomb structural body to have a roughened surface having predetermined roughness, the through-hole surface forming portion of a metal mold to be used for the extrusion molding process is roughened through an appropriate method.

Here, with respect to the material paste, the same material paste as explained in the above-mentioned aggregated honeycomb structural body may be used.

After the above-mentioned raw molded body has been dried by using a microwave drier or the like to form a dried body, plug paste, which forms plugs, is injected into predetermined through holes of the dried body so that sealing processes for sealing the through holes are carried out.

Here, with respect to the plug paste, the same plug paste as that explained in the above-mentioned integral honeycomb structural body may be used, and with respect to the sealing process, the same method as the method for the above-mentioned integral honeycomb structural body may be used except that the subject to be filled with the plug paste is different.

Next, the dried body that has been subjected to the sealing process is subjected to degreasing and sintering processes under predetermined conditions so that a porous ceramic member in which a plurality of through holes are placed in parallel with one another in the length direction with a partition wall interposed therebetween is manufactured.

Here, with respect to the conditions and the like of degreasing and sintering processes for the raw molded body, those conditions conventionally used for manufacturing a honeycomb structural body constituted by a plurality of porous ceramic members that are combined with one another through sealing material layers may be used.

Next, sealing material paste to be used for forming a sealing material layer 14 is applied with an even thickness to form a sealing material paste layer, and on this sealing material paste layer, a process for laminating another porous ceramic member 20 is successively repeated so that a laminated body of porous ceramic members 20 having a rectangular pillar shape with a predetermined size is manufactured.

With respect to the material for forming the sealing material paste, since the same material as that explained in the honeycomb structural body of the present invention can be used, the description thereof is omitted.

Next, the laminated body of the porous ceramic member 20 is heated so that the sealing material paste layer is dried and solidified to form the sealing material layer 14; thereafter, by cutting the peripheral portion into, for example, a shape as shown in FIG. 1, by using a diamond cutter or the like so that a ceramic block 15 is manufactured.

A sealing material layer 13 is formed on the circumference of the ceramic block 15 by using the sealing material paste so that a honeycomb structural body in which a plurality of porous ceramic members are combined with one another through sealing material layers is manufactured.

Any of the honeycomb structural bodies thus produced have a pillar shape, and the structures thereof are shown in FIGS. 1 and 2.

With respect to the application of the honeycomb structural body of the present invention, although not particularly limited, it is preferably used for exhaust gas purifying devices for use in vehicles.

FIG. 7 is a cross-sectional view that schematically shows one example of an exhaust gas purifying device for use in vehicles, which is provided with the honeycomb structural body of the present invention.

As shown in FIG. 7, an exhaust gas purifying device 800 is mainly constituted by a honeycomb structural body 80 of the present invention, a casing 830 that covers the external portion of the honeycomb structural body 80, a holding sealing material 820 that is placed between the honeycomb structural body 80 and the casing 830 and a heating means 810 placed on the exhaust-gas inlet side of the honeycomb structural body 80, and an introducing pipe 840, which is connected to an internal combustion device such as an engine, is connected to one end of the casing 830 on the exhaust gas inlet side, and an exhaust pipe 850 externally coupled is connected to the other end of the casing 830. In FIG. 7, arrows show flows of exhaust gases.

Moreover, in FIG. 7, the honeycomb structural body 80 may be prepared as the honeycomb structural body 10 shown in FIG. 1 or as the honeycomb structural body 30 shown in FIG. 3.

In the exhaust gas purifying device 800 having the above-mentioned arrangement, exhaust gases, discharged from the internal-combustion system such as an engine, are directed into the casing 830 through the introducing pipe 840, and allowed to flow into the honeycomb structural body 80 through the inlet side through holes and to pass through the wall portion (a partition wall); thus, the exhaust gases are purified, with particulates thereof being collected in the wall portion (a partition wall), and are then discharged outside through the exhaust pipe 850.

After a large quantity of particulates have been accumulated on the wall portion (the partition wall) of the honeycomb structural body 80 to cause an increase in pressure loss, the honeycomb structural body 80 is subjected to a regenerating process.

In the regenerating process, a gas, heated by using a heating means 810, is allowed to flow into the through holes of the honeycomb structural body 80 so that the honeycomb structural body 80 is heated to burn and eliminate the particulates deposited on the wall portion (partition wall).

Moreover, in the present invention, in addition to the above-mentioned method, the particulates may be burned and eliminated by using a post-injection system.

Moreover, the honeycomb structural body of the present invention may have a catalyst capable of purifying CO, HC, NOx and the like in the exhaust gases.

When such a catalyst is supported thereon, the honeycomb structural body of the present invention is allowed to function as a honeycomb structural body capable of collecting particulates in exhaust gases, and also to function as a catalyst converter for purifying CO, HC, NOx and the like contained in exhaust gases. Moreover, depending on cases, the honeycomb structural body makes it possible to lower the burning temperature of the particulates.

With respect to the catalyst, examples thereof include noble metals such as platinum, palladium, rhodium and the like. The catalyst, made from a noble metal such as platinum, palladium, rhodium and the like, is a so-called three-way catalyst, and the honeycomb structural body of the present invention which is provided with such a three-way catalyst is allowed to function in the same manner as conventionally known catalyst converters. Therefore, with respect to the case in which the honeycomb structural body of the present invention also functions as a catalyst converter, detailed description thereof is omitted.

Here, with respect to the catalyst that is supported on the honeycomb structural body of the present invention, not particularly limited to the above-mentioned noble metal, any catalyst may be supported as long as it can purify CO, HC, NOx and the like contained in exhaust gases.

EXAMPLES

The following description will discuss the present invention in detail by means of examples; however, the present invention is not intended to be limited by these examples.

17

Example 1

(1) Powder of α-type silicon carbide having an average particle size of 11 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after a slight amount of a plasticizer and a lubricant have been added and kneaded therein, the resulting mixture was extrusion-molded by using a metal mold having a surface roughness Ra of 10 μm at the portions corresponding to the through holes so that a raw molded product, which had almost the same cross-sectional shape as each of the cross-sectional shapes shown in FIGS. 4(a) to 4(d), was manufactured with an aperture ration of 2.54.

Next, the above-mentioned raw molded product was dried by using a micro-wave drier to form a ceramics dried body, and after predetermined through holes had been filled with a plug paste having the same composition as the molded product, the resulting product was again dried by using a drier, and then degreased at 400° C., and sintered at 2200° C. in a normal-pressure argon atmosphere for 3 hours to manufacture a porous ceramic member 20, which was a silicon carbide sintered body, and had a porosity of 42%, an average pore diameter of 9 μm, a size of 34.3 mm×34.3 mm×150 mm, the number of through holes of 23.3/cm$^2$ and a thickness of almost all the partition wall 23 of 0.41 mm, with large-capacity through holes and small-capacity through holes.

Here, on one end face of the columnar porous ceramic member 20, only the large-capacity through holes 21a were sealed with plugs, and on the other end face thereof, only the small-capacity through holes 21b were sealed with plugs.

(2) By using a heat resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, a large number of the porous silicon carbide members were combined with one another, and this was then cut by using a diamond cutter to form a cylindrical shaped ceramic block.

In this case, the thickness of the sealing material layers used for combining the porous ceramic members was adjusted to 1.0 mm.

Next, ceramic fibers made from alumina silicate (shot content: 3%, fiber length: 0.1 to 100 mm) (23.3% by weight), which served as inorganic fibers, silicon carbide powder having an average particle size of 0.3 μm (30.2% by weight), which served as inorganic particles, silica sol (SiO$_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the circumferential portion of the ceramic block by using the above-mentioned sealing material paste. Further, this sealing material paste layer was dried at 120° C. so that a cylinder-shaped honeycomb structural body having a diameter of 144 mm was produced.

The surface roughness of the wall faces constituting the through holes of the resulting honeycomb structural body and the porosity of the honeycomb structural body are shown in Table 1.

Examples 2 to 6 and 11 to 13

The same processes as Example 1 were carried out except that in the process (1), the cross-sectional shapes of the large-capacity through holes and the small-capacity through holes were formed into shapes as shown in Table 1, with the wall thickness being set to a value shown in Table 1, so that a porous ceramic member was manufactured, and a honeycomb structural body was then produced. The wall thickness, the surface roughness $R_y$ of through-hole wall faces, the density of the through holes and the porosity of the resulting honeycomb structural body are shown in Table 1.

Example 7

The same processes as Example 1 were carried out except that in the process (1), the cross-sectional shapes of the large-capacity through holes and the small-capacity through holes were formed into shapes as shown in Table 1, with the sintering conditions changed to 2000° C. and 3 hours, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Example 8

The same processes as Example 1 were carried out except that in the process (1), the cross-sectional shapes of the large-capacity through holes and the small-capacity through holes were formed into shapes as shown in Table 1, with the sintering conditions changed to 2200° C. and 1 hour, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Example 9

The same processes as Example 1 were carried out except that in the process (1), the cross-sectional shapes of the large-capacity through holes and the small-capacity through holes were formed into shapes as shown in Table 1, and that a mixed composition was obtained by using 100 parts by weight of a mixture made from 80% by weight of powder of α-type silicon carbide having an average particle size of 50 μm and 20% by weight of powder of β-type silicon carbide having an average particle size of 0.5 μm, 15 parts by weight of an organic binder (methyl cellulose) and 20 parts by weight of water, with the sintering conditions changed to 2300° C. and 3 hours, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Example 10

The same processes as Example 1 were carried out except that in the process (1), the cross-sectional shapes of the large-capacity through holes and the small-capacity through holes were formed into shapes as shown in Table 1, and that a mixed composition was obtained by using 100 parts by weight of a mixture made from 80% by weight of powder of α-type silicon carbide having an average particle size of 50 μm and 20% by weight of powder of β-type silicon carbide having an average particle size of 0.5 μm, 15 parts by weight of an organic binder (methyl cellulose) and 20 parts by weight of water, with the sintering conditions changed to 2300° C. and 6 hours, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Comparative Example 1

The same processes as Example 1 were carried out except that in the process (1), the cross-sectional shapes of the large-capacity through holes and the small-capacity through holes were formed into shapes as shown in Table 1 and that the wall thickness was set to a value shown in Table 1 so that a porous ceramic member was manufactured, and a honeycomb structural body was then produced. The wall thickness, the surface roughness $R_y$ of through-hole wall faces, the density of the through holes and the porosity of the resulting honeycomb structural body are shown in Table 1.

Here, the honeycomb structural body according to Comparative Example 1 corresponds to a honeycomb structural body 400 shown in FIG. 8, and the cross-sectional area of each of through holes 401 that are formed between wall portions 402 has the same value except for the end portions.

Comparative Example 2

The same processes as Example 1 were carried out except that in the process (1), the cross-sectional shapes of the large-capacity through holes and the small-capacity through holes were formed into shapes as shown in Table 1, and that a mixed composition was obtained by using 100 parts by weight of a mixture made from 60% by weight of powder of α-type silicon carbide having an average particle size of 11 μm and 40% by weight of powder of β-type silicon carbide having an average particle size of 0.5 μm, 5 parts by weight of an organic binder (methyl cellulose) and 20 parts by weight of water, with the sintering conditions changed to 1800° C. and 3 hours, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Comparative Example 3

The same processes as Example 1 were carried out except that in the process (1), the cross-sectional shapes of the large-capacity through holes and the small-capacity through holes were formed into shapes as shown in Table 1, and that a mixed composition was obtained by using 100 parts by weight of a mixture made from 80% by weight of powder of α-type silicon carbide having an average particle size of 50 μm and 20% by weight of powder of β-type silicon carbide having an average particle size of 0.5 μm, 15 parts by weight of an organic binder (methyl cellulose) and 20 parts by weight of water, with the sintering conditions changed to 2300° C. and 12 hours, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Comparative Example 4

The same processes as Example 1 were carried out except that in the process (1), the cross-sectional shapes of the large-capacity through holes and the small-capacity through holes were formed into shapes as shown in Table 1, and that a mixed composition was obtained by using 100 parts by weight of a mixture made from 80% by weight of powder of α-type silicon carbide having an average particle size of 50 μm and 20% by weight of powder of β-type silicon carbide having an average particle size of 0.5 μm, 15 parts by weight of an organic binder (methyl cellulose) and 20 parts by weight of water, with the sintering conditions changed to 2300° C. and 24 hours, so that a porous ceramic member was manufactured, and a honeycomb structural body was then produced.

The wall thickness, the surface roughness $R_y$ of through-hole wall faces, the density of the through holes and the porosity of the resulting honeycomb structural body are shown in Table 1.

Reference Example 1

The same processes as Example 1 were carried out except that in the process (1), the cross-sectional shapes of the large-capacity through holes and the small-capacity through holes were formed into shapes as shown in FIG. 9 so that a porous ceramic member was manufactured, and a honeycomb structural body was then produced. The wall thickness, the surface roughness $R_y$ of through-hole wall faces, the density of the through holes and the porosity of the resulting honeycomb structural body are shown in Table 1.

Here, the honeycomb structural body according to Reference Example 1 corresponds to a honeycomb structural body 200 shown in FIG. 9, and the through holes thereof are constituted by large-capacity through holes 201 each of which has a cross section having a hexagonal shape and small-capacity through holes 202 each of which has a cross section having a triangular shape, with the number of the small-capacity through holes 202 being set to about twice as many as the number of the large-capacity through holes 201.

Reference Examples 2 and 3

The same processes as Example 1 were carried out except that in the process (1), the cross-sectional shapes of the large-capacity through holes and the small-capacity through holes were formed into shapes as shown in Table 1 and that the wall thickness was set to a value shown in Table 1 so that a porous ceramic member was manufactured, and a honeycomb structural body was then produced. The wall thickness, the surface roughness $R_y$ of through-hole wall faces, the density of the through holes and the porosity of the resulting honeycomb structural body are shown in Table 1.

(Evaluation Method)
(1) Surface Roughness Measurements on Through-Hole Wall Face Each of the honeycomb structural bodies according to the examples, comparative examples and reference examples was cut in parallel with the through hole so that the through hole is exposed, and the surface roughness of the through hole was measured by using a surface roughness measuring device (SURFCOM 920A, made by Tokyo Seimitsu Co., Ltd.) and based upon the results, the surface roughness $R_y$ was determined in compliance with JIS B 0601. Table 1 shows the results.

(2) Pressure Loss Variations

As shown in FIG. 7, each of the honeycomb structural bodies of the examples, comparative examples and reference examples was placed in an exhaust passage of an engine to form an exhaust gas purifying device, and the engine was driven at the number of revolutions of 3000 min$^{-1}$ and a torque of 50 Nm for a predetermined period of time so that the amount of collected particulates was measured and the pressure loss was measured. The value of the initial pressure loss at this time and the pressure loss at the amount of collected particulates of 6 (g/L) are shown in Table 1.

(3) Relationship Between the Weight of Ashes and Pressure Loss

As shown in FIG. 7, each of the honeycomb structural bodies of the examples, comparative examples and reference examples was placed in an exhaust passage of an engine to form an exhaust gas purifying device, and the engine was driven at the number of revolutions of 3000 min$^{-1}$ and a torque of 50 Nm for a predetermined period of time; thereafter, experiments for repeating regenerating processes were carried out so that the weight of ashes accumulated in the through holes constituting the honeycomb structural body was measured and the pressure loss of the honeycomb structural body was measured. The value of the pressure loss at the time of 150 g of accumulated ashes is shown in Table 1.

FIG. 10 is a graph that indicates a relationship between the through-hole density and the pressure loss, and FIG. 11 is a graph that indicates a relationship between the surface roughness of the through-hole wall face and the pressure loss.

(4) Measurements on Porosity

The porosity was measured by using Archimedes method. The results are shown in Table 1.

As clearly indicated by the results shown in Table 1 and FIGS. 10 and 11, although there is no significant difference in the initial pressure loss in comparison with the honeycomb structural bodies according to comparative examples, the honeycomb structural bodies of examples had a smaller increase in the pressure loss upon collection of 6 (g/L) of particulates as well as upon deposition of 150 g of ashes, when the density of the through holes was out of the range of the present invention as well as when the surface roughness of wall faces forming the through holes was out of the range of the present invention. In this manner, the present invention makes it possible to maintain the pressure loss upon collection of particulates at a low level and also to maintain the pressure loss caused by deposition of ashes at a low level for a long time; thus, it becomes possible to effectively utilize the capacity of the large-capacity through holes, to reduce the load imposed on an engine, and consequently to provide a honeycomb structural body having a long service life. Consequently, it becomes possible to cut maintenance costs required for back washing and the like.

TABLE 1

Figure 5:
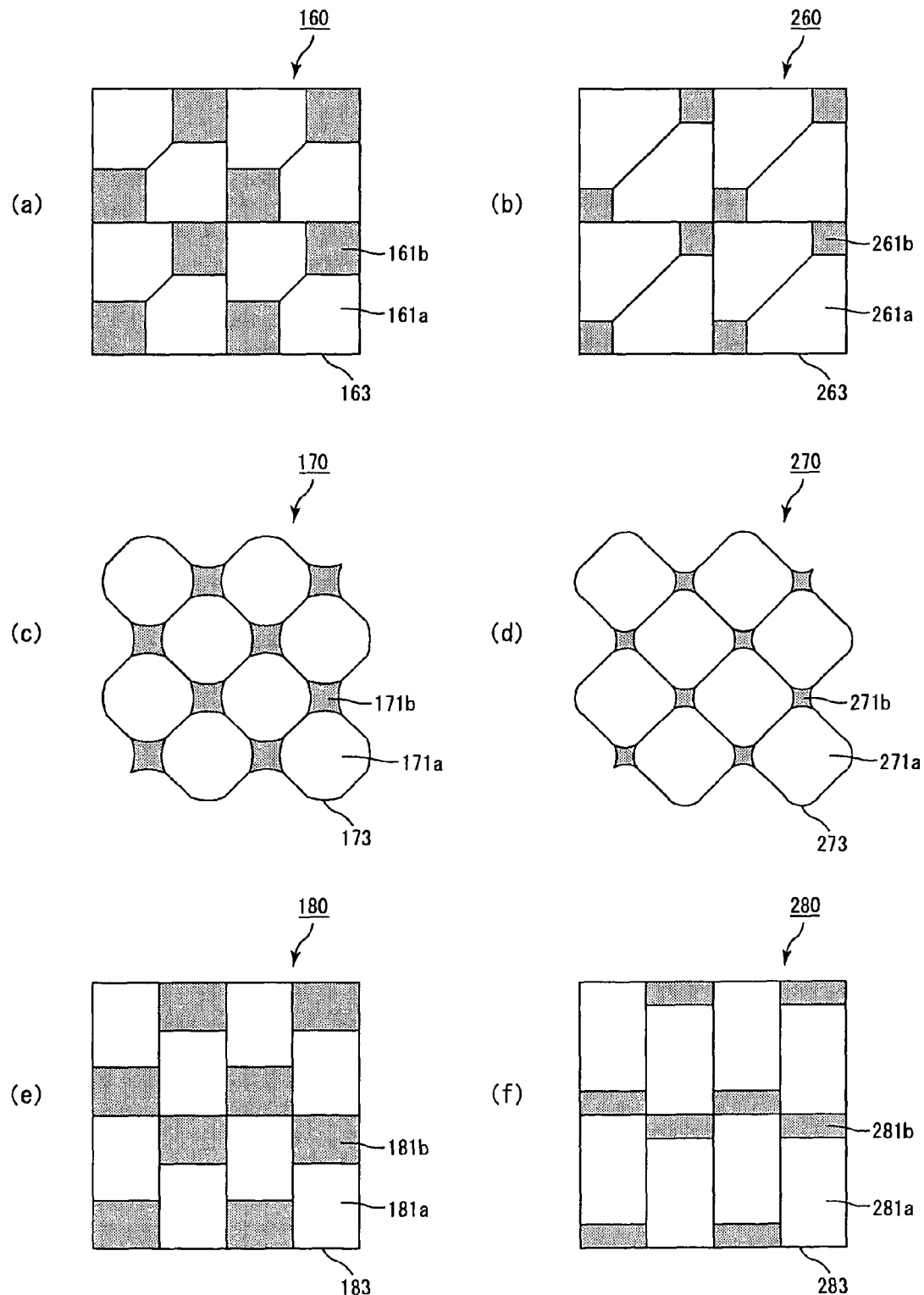
Figure 6:
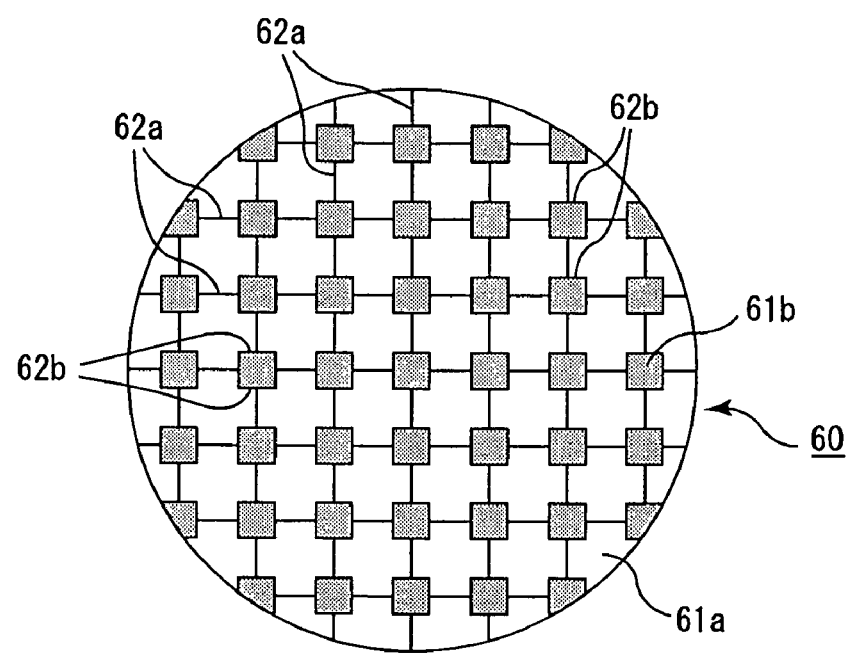
Figure 8:
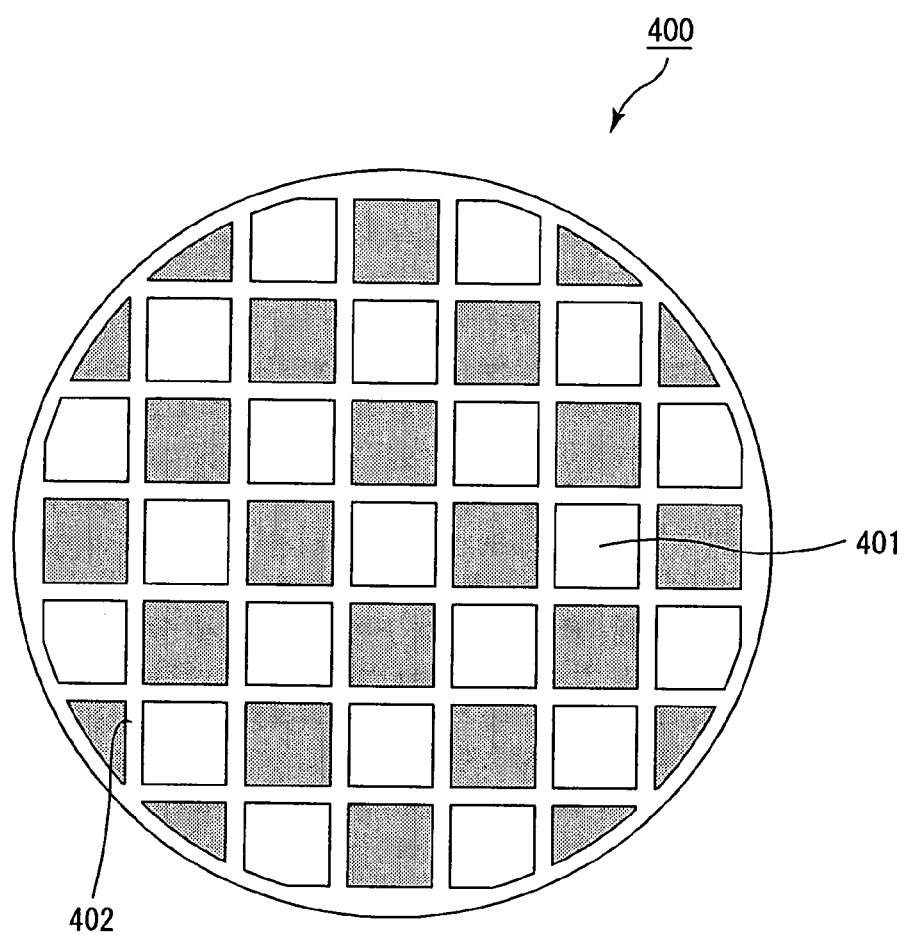
Figure 9:
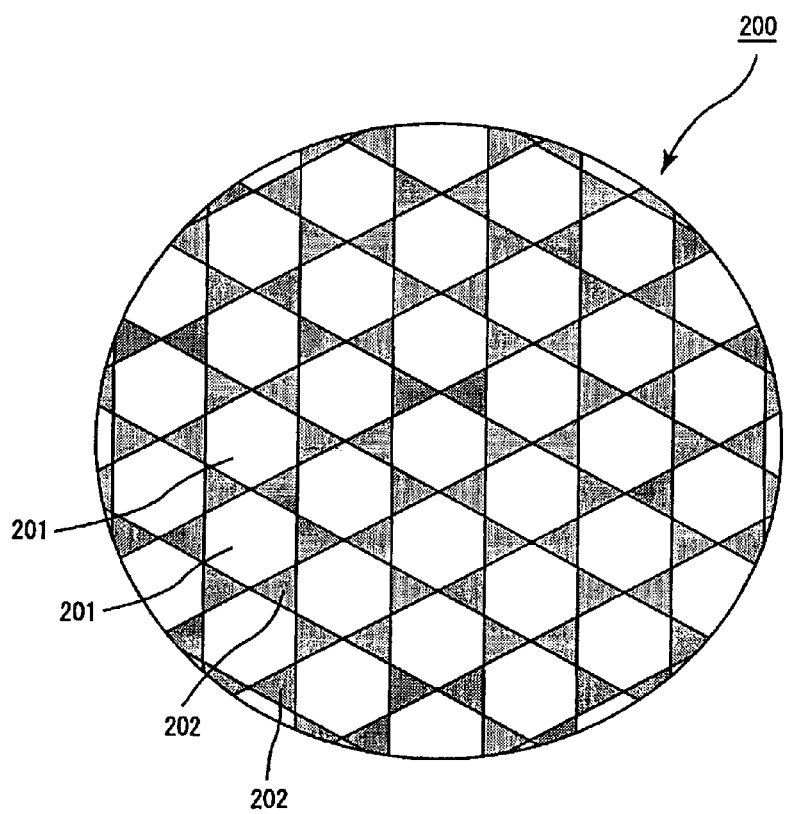

|  | Sectional shape | Wall thickness (mm) | Surface roughness of through hole wall face Ry (μm) | Density of through hole (pcs/cm$^2$) | Porosity (vol %) | Initial pressure loss (kPa) | Pressure loss upon collecting 6 (g/L) of particulates (kPa) | Pressure loss upon depositing 150 g of ashes (kPa) |
|---|---|---|---|---|---|---|---|---|
| Example 1 | FIGS. 4(a)-4(d) | 0.41 | 33 | 23.3 | 42 | 4.8 | 8.7 | 10.0 |
| Example 2 | FIGS. 5(c)-5(d) | 0.41 | 33 | 23.3 | 42 | 4.9 | 8.8 | 10.4 |
| Example 3 | FIG. 5(e) | 0.41 | 33 | 23.3 | 42 | 4.9 | 8.6 | 10.2 |
| Example 4 | FIG. 5(f) | 0.41 | 33 | 23.3 | 42 | 4.9 | 8.6 | 10.2 |
| Example 5 | FIGS. 5(a)-5(b) | 0.41 | 33 | 23.3 | 42 | 5.0 | 8.7 | 10.3 |
| Example 6 | FIG. 6 | 0.41 | 33 | 23.3 | 42 | 5.9 | 9.9 | 10.8 |
| Example 7 | FIGS. 4(a)-4(d) | 0.41 | 15 | 23.3 | 42 | 6.3 | 10.5 | 14.6 |
| Example 8 | FIGS. 4(a)-4(d) | 0.41 | 20 | 23.3 | 42 | 5.0 | 9.0 | 10.7 |
| Example 9 | FIGS. 4(a)-4(d) | 0.41 | 70 | 23.3 | 50 | 4.4 | 11.5 | 11.9 |
| Example 10 | FIGS. 4(a)-4(d) | 0.41 | 90 | 23.3 | 50 | 4.4 | 11.7 | 13.2 |
| Example 11 | FIGS. 4(a)-4(d) | 0.41 | 33 | 15.5 | 42 | 4.2 | 8.9 | 14.8 |
| Example 12 | FIGS. 4(a)-4(d) | 0.35 | 33 | 46.5 | 42 | 5.6 | 8.4 | 11.4 |
| Example 13 | FIGS. 4(a)-4(d) | 0.35 | 33 | 54.3 | 42 | 5.8 | 8.2 | 13.8 |
| Comparative Example 1 | FIG. 8 | 0.41 | 33 | 23.3 | 42 | 4.6 | 9.1 | 19.3 |
| Comparative Example 2 | FIGS. 4(a)-4(d) | 0.41 | 9 | 23.3 | 42 | 6.9 | 12.0 | 22.5 |
| Comparative Example 3 | FIGS. 4(a)-4(d) | 0.41 | 110 | 23.3 | 50 | 4.0 | 12.0 | 23.0 |
| Comparative Example 4 | FIGS. 4(a)-4(d) | 0.41 | 120 | 23.3 | 55 | 3.9 | 12.1 | 23.3 |
| Reference Example 1 | FIG. 9 | 0.41 | 33 | 23.3 | 42 | 6.7 | 10.7 | 18.6 |
| Reference Example 2 | FIGS. 4(a)-4(d) | 0.41 | 33 | 14.0 | 42 | 4.0 | 9.0 | 18.5 |
| Reference Example 3 | FIGS. 4(a)-4(d) | 0.35 | 33 | 69.8 | 42 | 6.5 | 9.2 | 18.7 |

Figure 1:
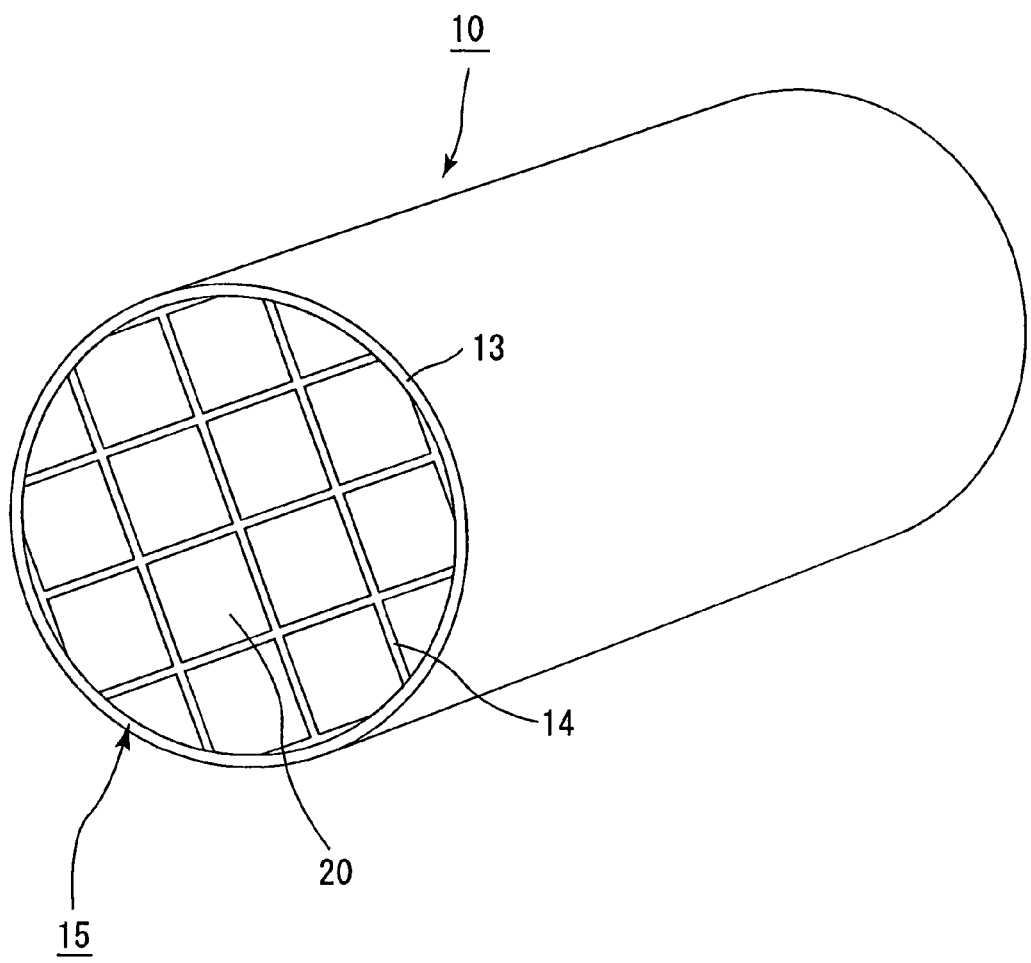
FIG. 1 a perspective view that schematically shows one example of a honeycomb structural body of the present invention.
Figure 2:
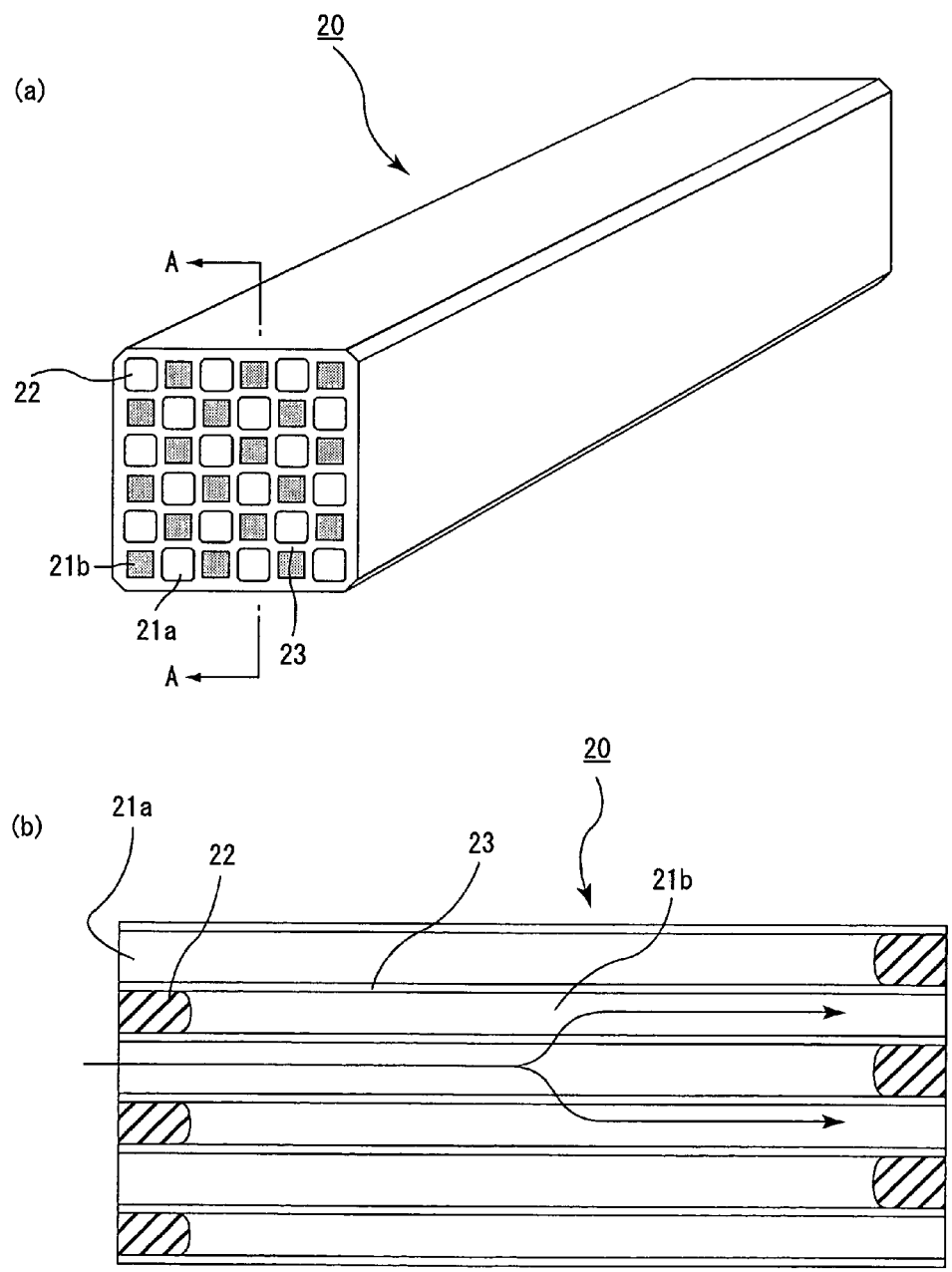
FIG. 2 (*a*) is a perspective view that schematically shows one example of a porous ceramic member that constitutes the honeycomb structural body shown in FIG. 1; and (*b*) is a cross-sectional view taken along line A-A of the porous ceramic member shown in (a).
Figure 3:
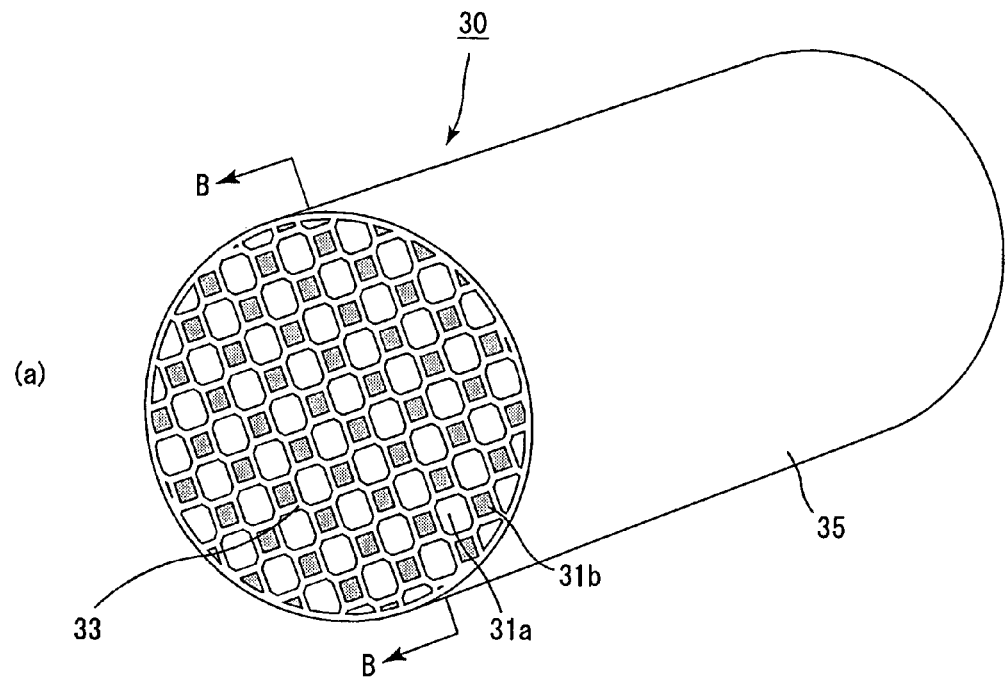
FIG. 3 (*a*) is a perspective view that schematically shows another example of the honeycomb structural body of the present invention; and (*b*) is a cross-sectional view taken along line B-B of the honeycomb structural body shown in (a).
Figure 3:
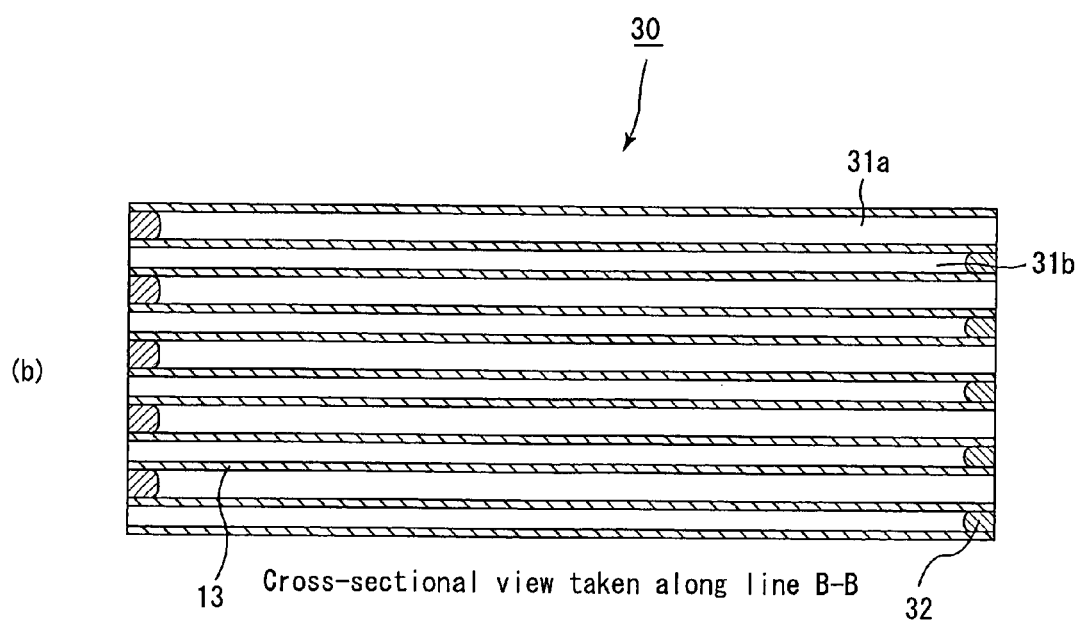
Figure 4:
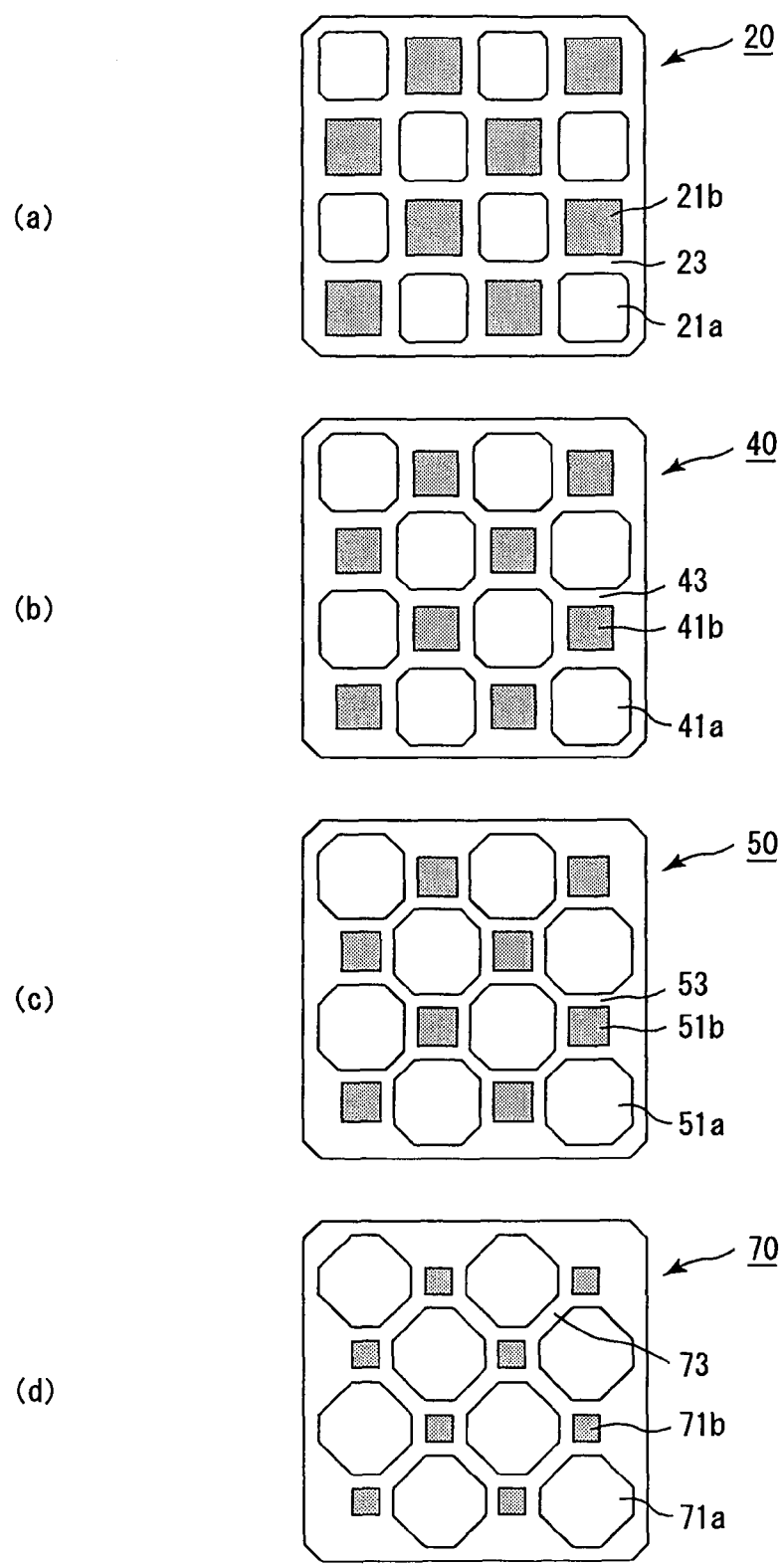

FIGS. 4 (a) to (d) are cross-sectional views each of which schematically shows a cross section perpendicular to the length direction of the porous ceramic member constituting the honeycomb structural body of the present invention.

FIGS. 5 (a) to (f) are longitudinal cross-sectional views that schematically show one example of the honeycomb structural body of the present invention.

FIG. 6 a longitudinal cross-sectional view that schematically shows another example of the honeycomb structural body of the present invention.

Figure 7:
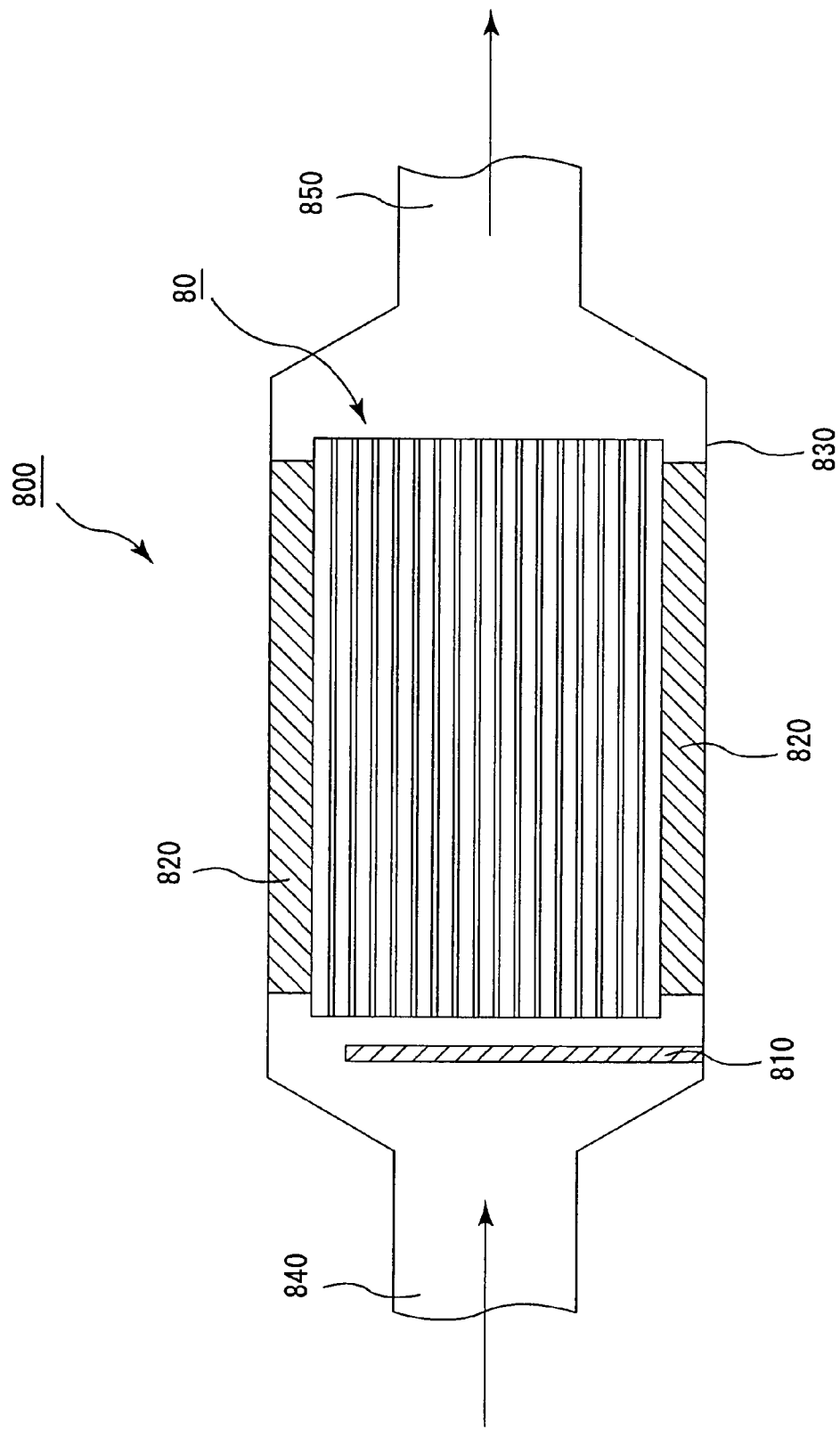

FIG. 7 a cross-sectional view that schematically shows one example of an exhaust gas purifying device using the honeycomb structural body of the present invention.

FIG. 8 a cross-sectional view that schematically shows one example of a conventional honeycomb structural body.

FIG. 9 a cross-sectional view that schematically shows one example of the honeycomb structural body.

Figure 10:
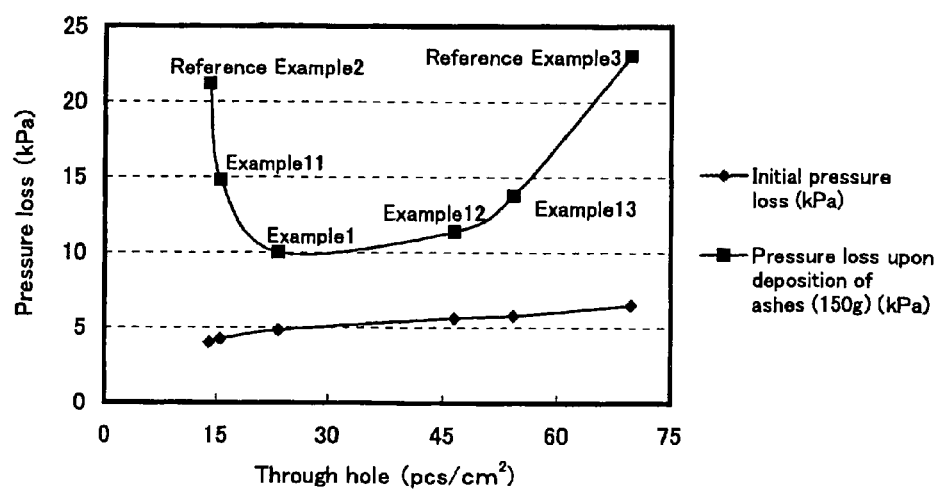

FIG. 10 a graph that shows a relationship between the through-hole density and the pressure loss of honeycomb structural bodies according to examples, comparative examples and reference examples.

Figure 11:
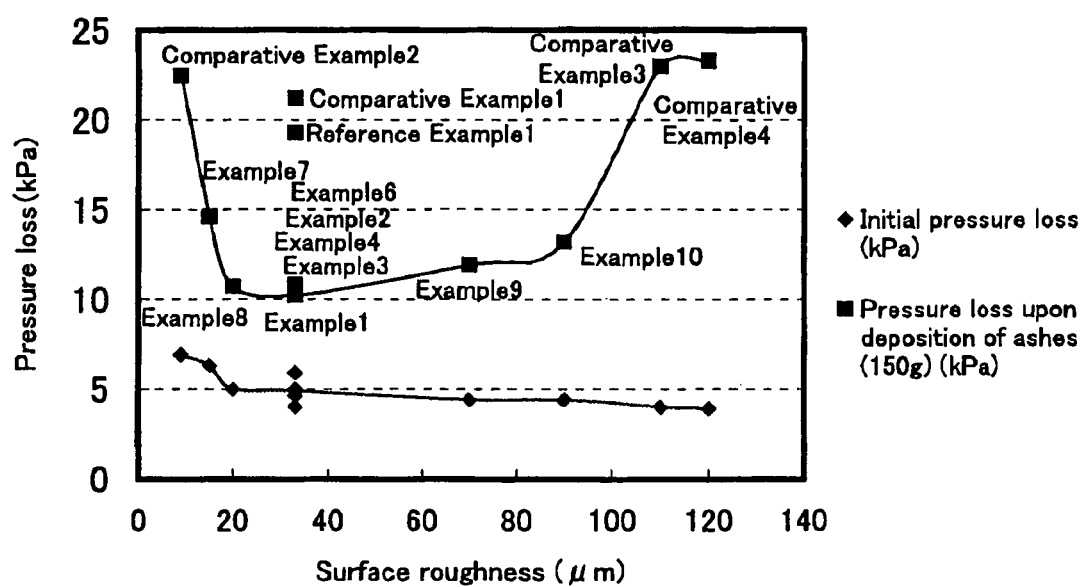

FIG. 11 a graph that shows a relationship between the surface roughness of through hole wall face and the pressure loss of the honeycomb structural bodies according to the examples, the comparative examples and the reference examples.

EXPLANATION OF SYMBOLS 10, 30 honeycomb structural body
13, 14 sealing material layer
15 ceramic block
20, 40, 50, 70 porous ceramic member
21a, 31a, 41a, 51a, 71a large-capacity through hole
21b, 31b, 41b, 51b, 71b small-capacity through hole
22 plug
23, 43, 53, 73 partition wall
33 wall portion
160, 170, 180, 260, 270, 280 porous ceramic member
161a, 171a, 181a, 261a, 271a, 281a large-capacity through hole
161b, 171b, 181b, 261b, 271b, 281b small-capacity through hole
163, 173, 183, 263, 273, 283 wall portion
60 porous ceramic member
61a large-capacity through hole
61b small-capacity through hole
62a, 62b wall portion

The invention claimed is:

1. A honeycomb structural body comprising:
a columnar porous ceramic block comprising a plurality of columnar porous ceramic members combined through sealing material layers into the porous ceramic block, each of the columnar porous ceramic members having a plurality of through holes extending in parallel with one another in a length direction of the porous ceramic block with a partition wall portion interposed between the through holes,
wherein the plurality of through holes includes a group of large-capacity through holes sealed at one end of the columnar porous ceramic block and a group of small-capacity through holes sealed at the other end of the columnar porous ceramic block, each of the large-capacity through holes has an octagonal shape in a cross section perpendicular to the length direction of the columnar porous ceramic block, each of the small-capacity through holes has a quadrangle shape in a cross section perpendicular to the length direction of the columnar porous ceramic block, the large-capacity through holes and the small-capacity through holes are positioned such that the partition wall portion has a wall thickness which is substantially uniform between the through holes, the partition wall portion has a porosity of 20% to 80%, the columnar porous ceramic block is configured to filter a gas from the group of large-capacity through holes, through the partition wall portion and into the group of small-capacity through holes, and the partition wall portion has a surface roughness $R_y$ in a range from 10 to 100 μm.

2. The honeycomb structural body according to claim 1, wherein the plurality of through holes has a density on a cross section perpendicular to the length direction which is set in a range from 15.5 to 62 pcs/cm$^2$.

3. The honeycomb structural body according to claim 1, wherein the large-capacity through holes have a relatively greater area on a cross section perpendicular to the length direction and the small-capacity through holes have a relatively smaller area on said cross section perpendicular to the length direction.

4. The honeycomb structural body according to claim 1, wherein the ratio of areas of cross sections of the group of large-capacity through holes to the group of small-capacity through holes is set in a range from 1.01 to 6.

5. The honeycomb structural body according to claim 3, wherein the ratio of areas of cross sections of the large-capacity through holes to the small-capacity through holes is set in a range from 1.01 to 6.

6. The honeycomb structural body according to claim 3, wherein on the cross section perpendicular to the length direction, at least one angle at which a portion of the partition wall portion, shared by one of said large-capacity through holes and an adjacent large-capacity through hole, and a portion of the partition wall portion, shared by one of said large-capacity through holes and an adjacent one of the small-capacity through holes, are caused to intersect with each other is set to an obtuse angle.

7. The honeycomb structural body according to claim 3, wherein the vicinity of each of corners on the cross section of at least one of the large-capacity through holes and the small-capacity through holes is formed by a curved line.

8. The honeycomb structural body according to claim 3, wherein the distance between centers of gravity of cross sections perpendicular to the length direction of adjacently located large-capacity through holes of the group of large-capacity through holes is set to be equal to the distance between centers of gravity of cross sections perpendicular to the length direction of adjacently located small-capacity through holes of the group of small-capacity through holes.

9. A filter for an exhaust gas purifying device for a vehicle, comprising the honeycomb structural body according to claim 1 is installed.

10. The honeycomb structural body according to claim 1, wherein the surface roughness $R_y$ of the partition wall portion is in a range from 15 to 90 μm.

11. The honeycomb structural body according to claim 1, wherein the surface roughness $R_y$ of the partition wall portion is in a range from 20 to 90 μm.

12. The honeycomb structural body according to claim 1, wherein the surface roughness $R_y$ of the partition wall portion is in a range from 20 to 70 μm.

13. The honeycomb structural body according to claim 1, wherein the large-capacity through holes having the octagonal shape and the small-capacity through holes having the quadrangle shape are alternately positioned such that the partition wall portion interposed between the through holes forms substantially a constant thickness.

14. The honeycomb structural body according to claim 1, wherein the ratio of areas of cross sections of the group of large-capacity through holes to the group of small-capacity through holes is set in a range from 1.2 to 5.

15. The honeycomb structural body according to claim 1, wherein the ratio of areas of cross sections of the group of large-capacity through holes to the group of small-capacity through holes is set in a range from 1.2 to 3.

* * * * *